United States Patent
Wilson et al.

(10) Patent No.: US 6,704,803 B2
(45) Date of Patent: Mar. 9, 2004

(54) METHOD AND SYSTEM FOR DISTRIBUTING DATA EVENTS OVER AN INFORMATION BUS

(75) Inventors: Douglass J. Wilson, Boston, MA (US); Mark T. Colan, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/222,467

(22) Filed: Dec. 29, 1998

(65) Prior Publication Data

US 2003/0163598 A1 Aug. 28, 2003

Related U.S. Application Data

(60) Provisional application No. 60/072,576, filed on Jan. 26, 1998, and provisional application No. 60/072,577, filed on Jan. 26, 1998.

(51) Int. Cl.[7] .............................................. G06F 9/44
(52) U.S. Cl. .................................. 709/315; 709/316
(58) Field of Search ............................... 709/100, 101, 709/103, 213, 203, 315, 316, 217, 200

(56) References Cited

U.S. PATENT DOCUMENTS

| | | | |
|---|---|---|---|
| 5,625,818 A | * | 4/1997 | Zarmer et al. ........... 707/104.1 |
| 5,786,815 A | | 7/1998 | Ford |
| 5,842,020 A | | 11/1998 | Faustini |
| 5,850,449 A | * | 12/1998 | McManis .................... 713/161 |
| 5,937,064 A | | 8/1999 | Eick et al. |
| 5,956,491 A | * | 9/1999 | Marks ........................ 709/250 |
| 5,978,579 A | | 11/1999 | Buxton et al. |
| 5,991,534 A | | 11/1999 | Hamilton et al. |
| 6,005,568 A | | 12/1999 | Simonoff et al. |

(List continued on next page.)

Primary Examiner—John Follansbee
Assistant Examiner—The Thanh Ho
(74) Attorney, Agent, or Firm—Kudirka & Jobse, LLP

(57) ABSTRACT

A group of protocols is described that establish an information bus. The protocols allow various applications and components to plug into the information bus. As a member of the bus, each application or component can exchange information with any other application or component in a structured way. The information bus is especially useful in interconnecting Java beans and applets in a Java virtual machine and in a distributive computer environment. An object oriented computer system having multiple participants is disclosed that utilizes a communications bus for sharing data between the multiple participants. The communications bus comprises membership generator logic, data event builder logic, data notification logic, and data control logic. The membership generator logic is configured to grant each requesting participant membership to the communications bus. The data event builder logic is configured to prepare data events occurring the computer system. The data notification logic is responsive to the data event builder logic and is configured to notify all participant members of the data events generated by the data event builder logic. The data control logic, which is coupled to the data notification logic, is configured to prioritize the notification of data events to the multiple participants of the communications bus. The data event can serve to announce the availability of a new data element, to request a given data element located in one of the member participants, or to announce a changed data element in one of the member participants. The data control logic can be configured to prioritize the notification of data events to selected groups of the multiple participants and it can be configured to provide selected grouping of the multiple participants. In addition, the data control logic may be configured to establish a virtual machine bridge between a first data controller and a first virtual machine and a second data controller and a second virtual machine. In addition, the membership generator logic generates a list of registered applications.

26 Claims, 7 Drawing Sheets

U.S. PATENT DOCUMENTS

| | | | |
|---|---|---|---|
| 6,052,729 A | * | 4/2000 | Robinson .................... 709/224 |
| 6,064,382 A | | 5/2000 | Diedrich et al. |
| 6,073,163 A | | 6/2000 | Clark et al. |
| 6,131,118 A | | 10/2000 | Stupek, Jr. et al. |
| 6,151,643 A | * | 11/2000 | Cheng et al. ............... 709/200 |
| 6,178,429 B1 | * | 1/2001 | Cherf ......................... 707/200 |
| 6,260,077 B1 | | 7/2001 | Rangarajan et al. |
| 6,272,559 B1 | | 8/2001 | Jones et al. |
| 6,275,953 B1 | | 8/2001 | Vahalia et al. |
| 6,314,448 B1 | | 11/2001 | Conner et al. |
| 6,327,613 B1 | | 12/2001 | Goshey et al. |
| 6,347,085 B2 | * | 2/2002 | Kelly ......................... 370/352 |
| 6,356,948 B1 | * | 3/2002 | Barnett et al. .............. 709/236 |

* cited by examiner

METHOD AND SYSTEM FOR DISTRIBUTING DATA EVENTS OVER AN INFORMATION BUS

RELATED APPLICATIONS

This application claims the benefit of provisional application Nos. 60/072,576 and 60/072,577, both filed Jan. 26, 1998.

This application is the one of five U.S. patent applications filed on an even date herewith and commonly assigned, including:

Ser. No. 09/222,489, by Douglass J. Wilson et. al., entitled "Method and System for Communicating Information Among Interactive Applications";

Ser. No. 09/222,201, by Douglass J. Wilson et. al., entitled "Method and System for Controlling Data Acquisition Over and Information Bus", now U.S. Pat. No. 6,266,716;

Ser. No. 09/222,494, by Douglass J. Wilson et. al., entitled "Method and System for Retrieving Data Over An Information Bus"; and Ser. No. 09/222,520, by Douglass J. Wilson et. al., entitled "InfoCenter User Interface for Applets and Components".

The subject matters of the above-identified copending patent applications are hereby incorporated herein by reference.

FIELD OF THE INVENTION

The present invention relates generally to information management among applications and, more particularly, to providing an information bus for allowing interactive applications to distribute data one to another.

BACKGROUND OF THE INVENTION

Numerous advances have been made recently to simplify the manner in which users interact with computer systems. For example, graphic user interfaces (GUI) have been created to provide visually intuitive means of interacting with a computer. In particular, GUIs such as that available in the Workplace Shell, part of the OS/2® operating system, commercially available from IBM Corporation, Boca Raton, Fla., enable users to process and store data using graphic metaphors which resemble real life objects. One of the major components of these and other GUIs is the icon, i.e., a small graphical representation of a familiar object, typically implemented with a bit map, which represents an object, data or other resource available on the computer system. The work area or "desktop" of the GUI may contain multiple icons which are easily selected and manipulated by the user with a pointing device i.e., a mouse, pen, touch screen or even speech recognition software. Such interfaces have vastly reduced the level of sophistication and experience necessary for users to interact in a meaningful manner with the computer system and, accordingly, have increased user productivity.

One of the major developments in the field of software design has been the emergence of object-oriented technology. As explained in greater detail hereinafter, object-oriented technology enables the analysis, design and implementation of software systems with intelligent, autonomous agents called objects. Such objects facilitate the design of modular software that more closely mimics the physical or logical entities within the real world.

One of the more recent developments in object-oriented programming is the Java® programming language developed by Sun Microsystems, Mountainview, Calif. The Java programming language is an object-oriented language, having many elements in common with the C programming language and C++ programming language, with additional modifications. The Java programming language has the benefits of an interpreted language in the performance of compiled code. To enable Java applications to execute on a computer network, a compiler generates an architecture-neutral object file format, i.e. the compiled code is executable on many processors, given the presence of the Java-runtime system.

The Java language enables developers to write custom applications called Java applets. When integrated into webpages delivered over the Internet, Java applets allow expert graphics rendering, real-time interaction with users, live information updating and full use of multimedia and instant interaction with servers over a computer network. With the Java programming language, many applications will have better performance because multiple concurrent threads of activity in the applications were supported by the multithreading built into the Java environment.

The Java language and environment, including the JavaBeans specification provide mechanisms for the creation and management of small components whose function represent the building block to use in applications such as web applications. The term component as used in the specification, refers to Java applets as well as to Java Beans.

One method of providing data exchange across components sharing a common bus is known as Dynamic Data Exchange (DDE), found in Windows, marketed by Microsoft. The DDE uses an event-response model, where an interaction depends on the receiving application to understand a specific event and respond with application-specific callbacks. During operation, the communicating applications must be aware of each other and be in actual direct communication with one another. This requires interrupts and protocols to be formed that are time and resource consuming in order to share system information among applications and components.

Notwithstanding the current developments in data communication among applications and components in an object-oriented environment, a need exists for a system in which the semantics of data flow are based on interpreting the contents of data and the names of the data, not on the names or parameters of the events associated with the generation of the data.

In addition, a need exists for a system in which data flow among a plurality of components in a computer system, are capable of exchanging data without the need for a data broker to control the semantics of data flow among components or applications.

SUMMARY OF THE INVENTION

The widespread adoption of the Java programming language by the Internet Community creates an opportunity for developers to create a new class of interactive applications. The language and environment specifications provide mechanisms for the creation and management of small reusable feature sets known as Java Beans, whose functions generally represent only a portion of a Web application. However, the specifications do not suggest methods by which these beans should dynamically exchange data.

The disclosed invention interconnects beans by defining a small number of interfaces between cooperating beans, and specifying the protocol for use of those interfaces. In this specification, the fundamental building block for data exchange is the "data item." The specification details how various forms of information are represented as data items, the lifetime management of these items, and the protocols for querying and extracting information from these items.

The protocols described here are based on the notion of an information bus. That is, all components that implement these interfaces can plug into the information bus. As a member of the bus, any component can exchange information with any other component in a structured way. Generally, the bus is asynchronous and is symmetric in the sense that no component may be considered the master of the bus; however, provision is made in the protocol for a controlling component that can act as the bus master or arbitrator of bus conversations.

In accordance with the present invention, an object oriented computer system having multiple participants is disclosed that utilizes a communications bus for sharing data between the multiple participants. The communications bus comprises membership generator logic, data event builder logic, data notification logic, and data control logic. The membership generator logic is configured to grant each requesting participant membership to the communications bus. The data event builder logic is configured to prepare data events occurring the computer system. The data notification logic is responsive to the data event builder logic and is configured to notify all participant members of the data events generated by the data event builder logic. The data control logic, which is coupled to the data notification logic, is configured to prioritize the notification of data events to the multiple participants of the communications bus. The data event can serve to announce the availability of a new data element, to request a given data element located in one of the member participants, or to announce a changed data element in one of the member participants. The data control logic can be configured to prioritize the notification of data events to selected groups of the multiple participants and it can be configured to provide selected grouping of the multiple participants. In addition, the data control logic may be configured to establish a virtual machine bridge between a first data controller and a first virtual machine and a second data controller and a second virtual machine. In addition, the membership generator logic generates a list of registered applications.

In accordance with another aspect of the present invention, a method is disclosed that distributes data events between multiple applications operating on a computer system. The method comprise the steps of connecting each application to an information bus, registering each application with the information bus, assigning each application to a selected data controller, sending data events over the information bus to each data controller, and forwarding the data events to each application assigned to each data controller. The data event may be a request for a data element found within one of the applications, an announcement of an available data element, or an announcement of a changed data element. The method may further comprise the steps of establishing an order of priority to notify each data controller of the data events and establishing an order of priority to notify each application assigned to each data controller of the data events. An additional step can include establishing a virtual machine bridge between a first data controller in a first virtual machine and a second data controller in a second virtual machine. Moreover, the method may also perform the steps of adding each registered application to a list of members of the information bus and adding each data controller to a list of data control members of the information bus.

BRIEF DESCRIPTION OF THE DRAWINGS

The above and other features, objects and advantages of the invention will be better understood by referring to the following detailed description in conjunction with the accompanying drawing in which.

DETAILED DESCRIPTION OF THE PREFERRED EMBODIMENT

Figure 1:
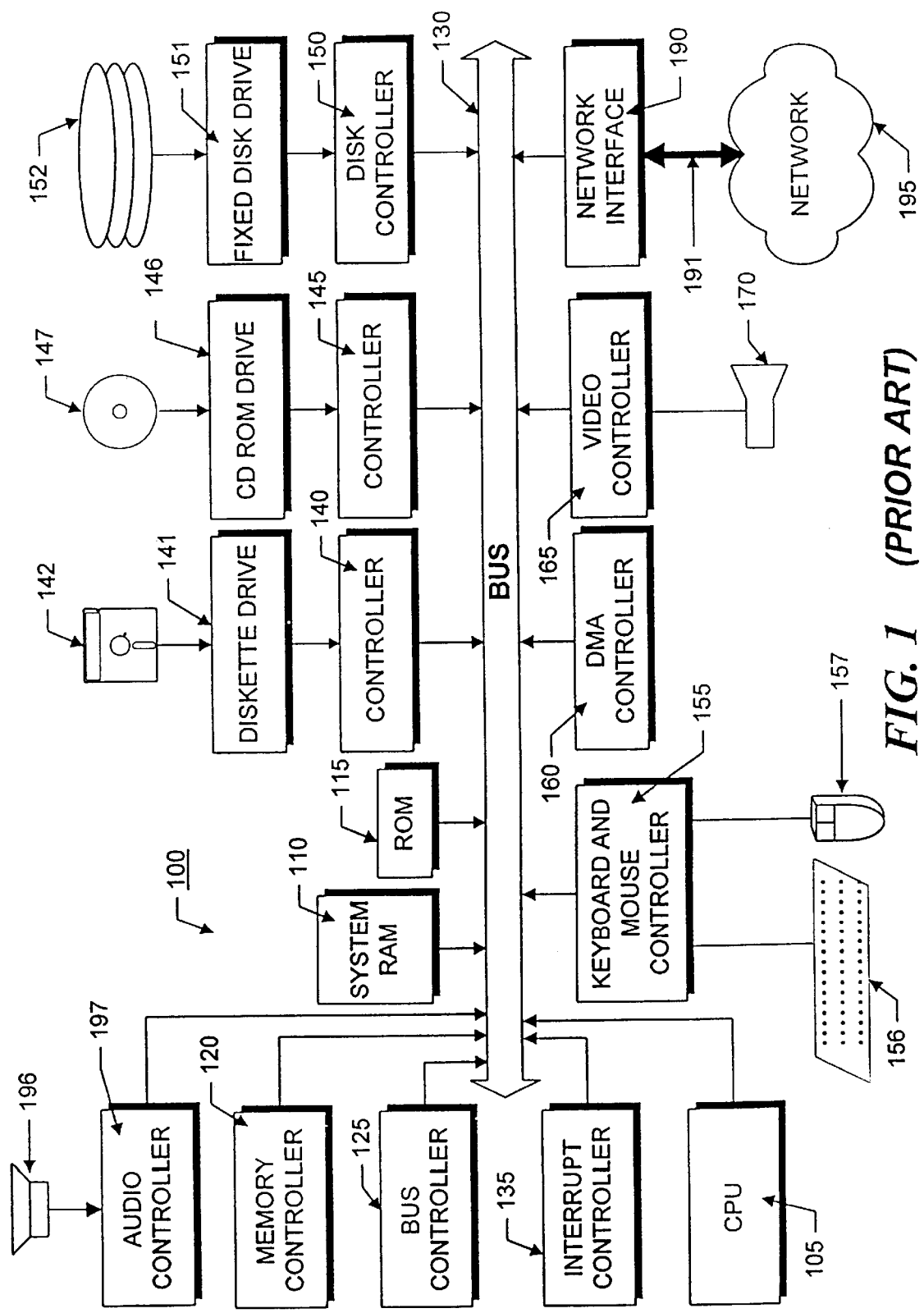
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141, which is, in turn, connected to bus 30 by a controller 140. Similarly, CD ROM 147 is insertable into CD ROM drive 146 which is, in turn, connected to bus 130 by controller 145 Hard disk 152 is part of a fixed disk drive 151 that is connected to bus 130 by controller 150.

User input to computer system 100 may be provided by a number of devices. For example, a keyboard 156 and mouse 157 are connected to bus 130 by controller 155 An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. or Windows 95 from Microsoft Corp., Redmond, Wash. The operating system controls allocation of system resources and performs tasks such as processing scheduling, memory management, networking, and I/O services, among things. In particular, an operating system 210 resident in system memory and running on CPU 105 coordinates the operation of the other elements of computer system 100. The present invention may be implemented with any number of commercially available operating systems including OS/2, UNIX Windows NT and DOS, etc. One or more applications 202 such as Lotus Notes, commercially available from Lotus Development Corp., Cambridge, Mass., may be executable under the direction of operating system 210. If operating system 210 is a true multitasking operating system, such as OS/2, multiple applications may execute simultaneously. The applications are interconnected not only with operating system 210, but also with one another using an information bus (InfoBus) 204, which provides a mechanism for the applications to share data with one another.

Figure 2:
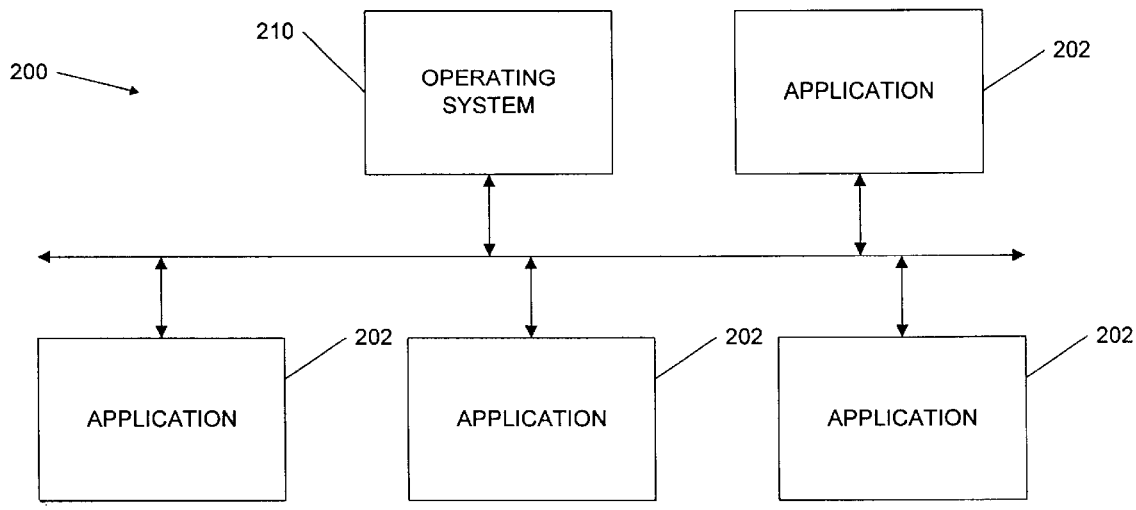
FIG. 2 is a conceptual diagram of the elements comprising the bus protocol in accordance with the present invention.

FIG. 2 illustrates conceptually the component system 200 in accordance with the present invention. In a preferred embodiment, the elements of component system 200 are implemented in the Java programming language using object-oriented programming techniques. The Java language is well-known and many articles and texts are available which describe the language in detail. In addition, Java compilers are commercially available from several vendors including Sun Microsystems, Inc., Mountainview, Calif. Accordingly, for reasons of clarity, the details of the Java language the Java Virtual Machine environment and the operation of a Java compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers and objects can model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime, memory is allotted and data structures are created.

The principle benefits of object-oriented programming techniques arise out of three basic principles; encapsulation, polymorphism and inheritance. More specifically, objects can be designed to hide, or encapsulate, all, or a portion of, their internal data structures and the internal functions. More particularly, during program design, a program developer can define objects in which all or some of the attributes and all or some of the related functions are considered "private" or for use only by the object itself. Other data or functions can be declared "public" or available for use by other programs. Defining public functions for an object that access the object's private data can control access to the private variables by other programs. The public functions form a controlled and consistent interface between the private data and the "outside" world. Any attempt to write program code that directly accesses the private variables causes the compiler to generate an error during program compilation which error stops the compilation process and prevents the program from being run.

Polymorphism is a concept that allows objects and functions which have the same overall format, but which work with different data, to function differently in order to produce consistent results. For example, an addition function may be defined as variable A plus variable B (A+B) and this same format can be used whether A and B are numbers, characters or dollars and cents. However, the actual program code that performs the addition may differ widely depending on the type of variables that comprise A and B. In this example, polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions that produce analogous results to be "grouped" in the program source code to produce a more logical and clear program flow.

The third principle that underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form. Overriding or modification does not alter the function in the base class, but merely modifies the use of the function in the subclass. The creation of a new subclass that has some of the functionality (with selective modification) of another class allows software developers to easily customize existing code to meet their particular needs.

Infobus Overview

In light of the overview of Object Oriented Programming and Java applications, now is presented a system and method that adopts standards by which a wide range of Java components acting as data producers and consumers can communicate data. It does this by defining a set of Java interfaces called the InfoBus interfaces. Java components that implement these interfaces are referred to as information bus ("InfoBus") components. The InfoBus is also described in detail in a specification, with working computer program code, written on the InfoBus standard by Mark Colan, entitled, InfoBus 1.1.1, released August, 1998, incorporated by reference herein for all purposes.

The InfoBus architecture facilitates the creation of applications built from Java Beans that exchange data asynchronously. This can be done by way of applets in an HTML page, or by way of beans assembled by a builder environment. InfoBus can also be used by arbitrary Java classes, including applets, servlets, and so on. Although the disclosure is presented in a Java environment, the application of the method and system extend beyond the Java environment and apply to any community of applications within a common communication protocol. Hence, the InfoBus may be used in other environments such as, for example, Xwindows, networking environments, and other systems that host interactive applications and that desire to share data among the various applications.

In the specific embodiment here presented, the InfoBus is designed for components working together in the same Java Virtual Machine (JVM). The current embodiment may also be extended to deal with components working in separate JVMs, such as on different processors.

In general, all Java Beans loaded from a single class loader can "see" other beans from the same loader and make direct method calls on those beans. However, these cross-bean calls are currently based on well-known interfaces or base classes. Beans use "introspection" to "learn" or "discover" information about peer beans at run time. In such a case, one bean can infer an API supported by another by detecting certain "design patterns" in the names of methods discovered through introspection. By contrast, the InfoBus interfaces form a tightly typed contract between cooperating beans. No inferring is required, and procedure calls are direct.

The InfoBus interfaces allow the application designer to create data flows between cooperating beans. In contrast to an event/response model, where the semantics of an interaction depend upon understanding a bean-specific event and then responding to that event with bean-specific callbacks to the event raiser, the InfoBus interfaces have very few events and have an invariant set of method calls for all components. The semantics of the data flow are based on interpreting the contents of data that flows across the InfoBus interfaces, not in the names or parameters from events, nor in the names or parameters of callbacks.

Figure 3:
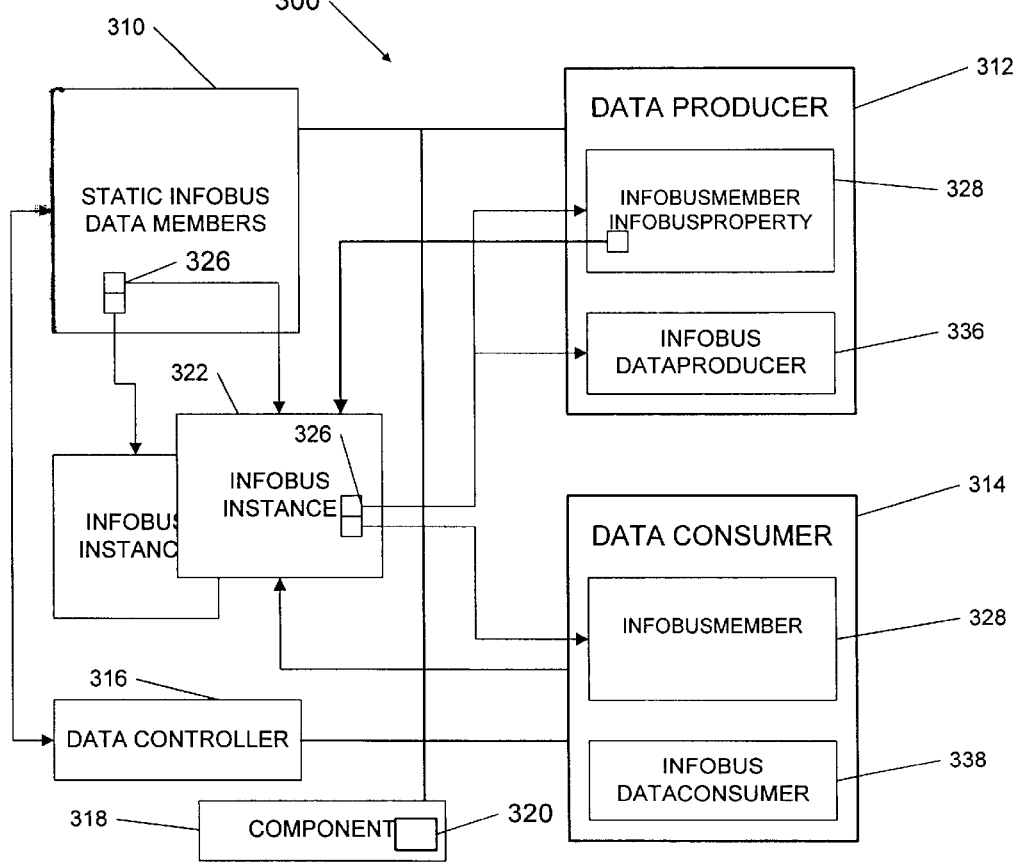
FIG. 3 illustrates conceptually a Java virtual machine and the components comprising the info bus system in accordance with the present invention.

FIG. 3 is a block diagram depicting an overall architecture defined by the InfoBus protocol as supported within a Java Virtual Machine (JVM) 300. There are three types of feature sets or Beans provided in the InfoBus class 310. The Beans application can be classified in three types: data producers 312, data consumers 314, and data controllers 316. An individual component 318 can act as both data producer 312 and data consumer 314. Between each component 318, data flows in named objects known as data items 320. Data controllers 316 are specialized components that mediate the rendezvous between producers 312 and consumers 314.

The structure of an InfoBus application instance 322 leads to two principal requirements for InfoBus 310. First, the InfoBus supports the creation of interactive applications without requiring support of a "builder" application. That is, application designers are able to assemble these applications using conventional web page editing tools. Further, these applications should run in standard HTML interpreted environments (browsers) without requiring specific extensions or support beyond the basic Java language environment. This does not preclude enhanced capabilities in the presence of a JavaBeans-enabled environment.

Second, the InfoBus supports semantics that allow data to be communicated in a canonical format for consumption by multiple consumers. A canonical format involves both the encoding of data (numbers, strings, etc.) and navigation of data structure (rows, columns, tuples, etc.). The intent is that mechanisms used to format and recover data be based as closely as possible on mechanisms already available from Java itself and JavaBeans.

In this embodiment, the InfoBus interfaces and properties adhere to the structure of JavaBeans-based builders. These builders recognize the InfoBus properties and can create useful wirings between components.

Figure 4:
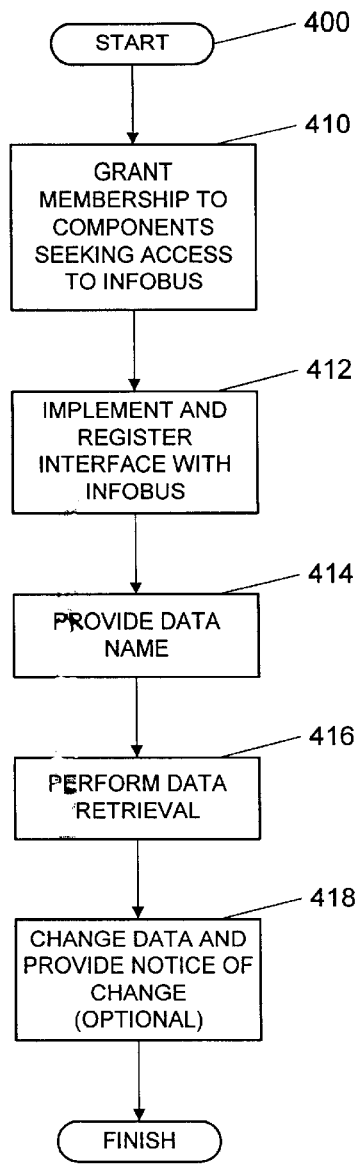
FIG. 4 is a flowchart illustrating the method steps of establishing the InfoBus in accordance with the present invention.

Next, FIG. 4 depicts a flow diagram of how the InfoBus protocol for performing data exchange is established and implemented as shown in FIG. 3. In block 400, the system begins and proceeds to block 410. In block 410, the protocol grants membership to any Java component seeking entry and access to the InfoBus. Any Java component can connect to the InfoBus by implementing an InfoBusMember 324, obtaining an InfoBus instance 322, and having the member join it. Once an object is a member of an InfoBus, it receives bus notifications by implementing an interface and registering it with the InfoBus according to block 412. Two event listener interfaces are defined to support two basic types of InfoBus applications. A data consumer 314 receives announcements about data availability by adding a consumer listener to the bus. Similarly, a data producer 312 receives requests for data by adding a producer listener to the bus.

In block 414, Infobus 310 establishes the name by which the data will be known for later access. Along with establishing the data names, the data producers 312 announce the availability of new data as the data becomes available (e.g., completion of a URL read, completion of a calculation, etc.). Consumers 314 solicit data from producers 312 as they require that data (applet initialization, button event, etc.). Data access or rendezvous is conducted by the name of the data. The application designer can designate the names for data items that can be exchanged.

Thus, all data producers 312 and consumers 314 must provide some mechanism for the application designer to specify data item names for rendezvous. For example, in a spreadsheet component, the user can "name" ranges on the sheet. This name is a natural mechanism for naming data that can be exported by the sheet in a role as a data producer. Similarly, a chart component needs a means of telling it what named data should be displayed in the chart.

Different data producers often use markedly different internal representations of data that is superficially similar. For example, a spreadsheet and a database both deal with tables, but store them quite differently. In a spreadsheet, the table of data might be represented as the output of a calculation (like matrix transpose), or as an array of formulas, whereas in a database the same information might be the result of a join query.

A data consumer 314 does not need a detailed understanding of the data producer's 312 internal data structures to use its data. Likewise, a charting component can draw a chart of a table from either a spreadsheet or a database whenever the table data makes sense as a chart. Before the InfoBus this sort of information sharing required consumers and producers to agree on a common encoding of the data. The InfoBus provides a set of interfaces for various standard protocols that are used to create data items with common access.

Continuing in block 416, Infobus 310 provides data retrieval of a data value that has been properly encoded. A data item can be retrieved as a String or a Java object. Java objects are typically object wrappers for primitive types such as Double or instances of other core classes such as Collection. The intent is to require as little specialized understanding of data formats on the part of the data consumer as possible. Lastly, in block 418, the data producer 314 may optionally change the data and then provide notice within the InfoBus membership of the data change. A consumer can attempt to change the value of data items. The producer enforces a policy on whether anyone can change data. It can also check for permissions from various consumers.

To have useful communication between disparate data producers and consumers, some understanding of the content of the data streams is necessary. Next, it is important to establish what kinds of data are suitable for transport over the InfoBus. While the InfoBus protocols do not prohibit the exchange of very detailed data streams between components an with understanding of each other's semantics (e.g., a spreadsheet file import filter passing internal representations of the spreadsheet data to a sheet display component), it does not particularly facilitate this.

When deciding if data is suitable for transport, it is useful to ask if there is (1) more than one data consumer 314 interested in this item, and (2) more than one data producer 312 likely to produce an item of equivalent encoding. Essentially, does this item and its structure represent a class of data to be transferred?

Membership

The InfoBus class is the main component of the data exchange capability of the InfoBus. An instance of the InfoBus class is the meeting place where members can join. A named InfoBus instance is one created on the basis of a name, which can be specified via a builder environment, externally-specified property, user input, or an application string.

A default InfoBus instance is one that is created on the basis of a generic name calculated from a DOCBASE in a Component context. To find a default InfoBus the component must either be an Applet itself, or have an applet in its AWT containment hierarchy, so that the system can traverse upwards to the applet in order to get the DOCBASE. The caller itself need not be such a component, but it must be able to supply a Component context.

The advantage of using a default InfoBus is convenience. An Applet that joins its default InfoBus will be able to see other components on the same web page that have joined their default InfoBus: because they have a common DOCBASE, they share a common default InfoBus. This is convenient for applets and other Java components that can supply a Component context.

The InfoBus class 310 makes use of static methods and static data to manage and access a list of active InfoBus instances 322. In particular, a static method called InfoBus.get( ) is called by a prospective member 326 to obtain an InfoBus instance 322 for all future transactions. The get( ) method locates or creates an instance 322 of the InfoBus class 310 on the basis of the name or Component context, and manages it by way of a list of active instances 326.

A component 318 implements InfoBusMember 328 to join the InfoBus 310, in preparation for receiving events about data on the bus. Membership is typically established during class initialization (for example, in applets, in the init( ) method). Component 318 can join more than one InfoBus, but it must use a separate InfoBusMember object 328 for each InfoBus 310 it wishes to join. A component 318 that has created separate members to join more than one bus can use the same event listener object (described later) to listen for events from more than one bus.

Figure 5:
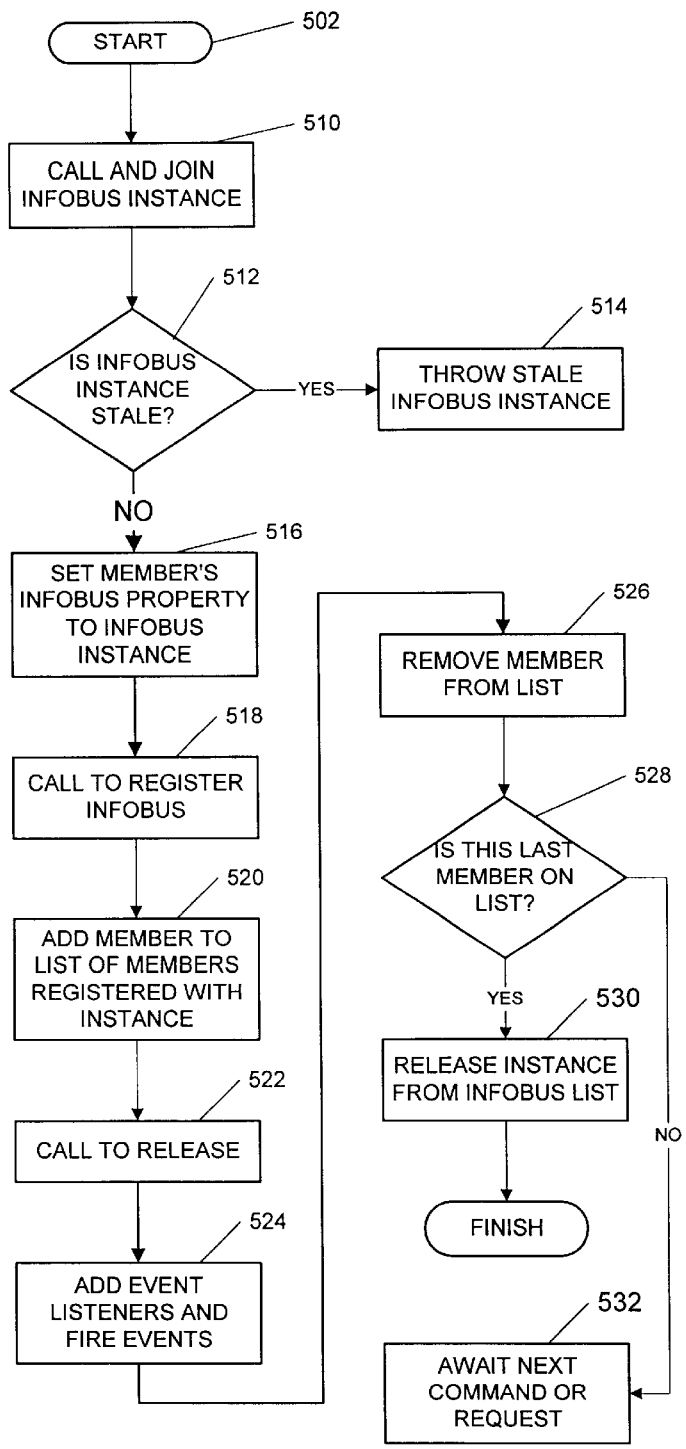
FIG. 5 is a flowchart illustrating the method steps of establishing membership to the InfoBus in accordance with the present invention.

InfoBusMember 328 is implemented by generating an instance of InfoBusMemberSupport and delegating each method to the support class. The support class provides a method to join the bus called joinInfoBus( ). This method starts a sequence of calls between InfoBus and InfoBusMember to establish membership as depicted in the flow diagram of FIG. 5. After starting in block 502, the joinInfoBus( ) calls get( ) to obtain an InfoBus instance to join and then calls InfoBus.join( ) to join it in block 510. Next, in block 512, join( ) checks the InfoBus instance to see if it is stale. If it is, StaleInfoBusException is thrown in block 514. The InfoBus instance can become stale if join( ) is erroneously called after the InfoBus instance has been released. Resuming in block 516, join( ) calls the member's setInfoBus( ) method to set the member's InfoBus property to the InfoBus instance returned by get( ). This can result in throwing PropertyVetoException, in which case the member is not allowed to join the bus returned by get( ). When exceptions are not thrown, the member's setInfoBus( ) implementation, in block 518, calls InfoBus.register( ). Register( ), in block 520, adds the member to the list of members currently registered on this InfoBus instance, and calls the member's addInfoBusPropertyListener( ) to detect departures from the bus. When InfoBus.join( ) returns, in block 522, joinInfoBus( ) finishes by calling release( ), regardless of whether an exception was thrown.

Following a successful return from joinInfoBus( ), a member can call methods on the InfoBus it joined, per block 524, by obtaining a reference to the bus by way of its own getInfoBus( ) method. This allows the member to add one or more event listeners and to fire events to other members.

When the member calls the InfoBus.leave( ) method on the instance it previously joined, the InfoBus, in block 526, removes the member from its list, removes its property change listener from the member, and sets the member's InfoBus property to null. The close( ) method is called, in block 528, to check whether the InfoBus instance has lost its last member or event listener, and if so, in block 530, releases the instance from the list of active InfoBus instances so that it can be garbage collected.

For maximum flexibility, an InfoBus component should support these three means of joining an InfoBus:

If an InfoBus name is specified by way of a property or parameter, this name should be used when calling infoBusMemberSupport.joinInfoBus( ).

In the absence of a name to be used for an InfoBus, it should join the default InfoBus, if possible, supplying a Component context that can be used to locate a DOCBASE parameter.

All beans should be prepared to accept a change to the "InfoBus" property on their InfoBusMember implementation, to support their use in a bean builder environment.

InfoBus instances can be named with any number of 'unreserved' characters as defined by the URI specification, except that they may not begin with '%' or '-'. Names beginning with '%' are reserved and must not be used. Illegal names may cause an exception to be thrown. Additional data item naming conventions are given in more detail below.

The InfoBus defines security policies in the InfoBusPolicyHelper interface, described in detail below. Some of these policies control whether a member is allowed to get, join, or register with an InfoBus instance. The DefaultPolicy class can be configured to check permission to implement this interface before interface implementation.

A member ordinarily joins and leaves an InfoBus by way of the methods in InfoBusMemberSupport designed for these functions. In a browser environment, once a member joins a particular InfoBus, it generally remains as a member of the same bus until it terminates.

Many InfoBus participants will also be beans. When a bean is used in a builder environment, the builder may specify the InfoBus instance it wants the bean to join. Since beans will often join a default InfoBus as they initialize themselves, the builder may can reset the bean's "InfoBus" property to put it onto a different bus.

An InfoBus instance that is losing a member needs to release itself after losing the last member. Since changing the InfoBus property on a member happens outside of calling the leave( ) method, the InfoBus implements PropertyChangeListener and adds itself as a listener for each of its members.

The InfoBus event listeners (InfoBusDataConsumer and InfoBusDataProducer) also need to know when their associated InfoBusMember is changing membership, so they also set property change listeners. When they are notified, they must remove themselves from the listener list for the old InfoBus instance, and (if the new property value is not null) add themselves to the new instance.

A member object that has properties of its own, other than the "InfoBus" property, should override setInfoBus( ) to notify their own property change listeners, then call InfoBusMemberSupport.setInfoBus( ).

InfoBus instances are managed internally by keeping the active instances on a list. Whenever a particular InfoBus instance is losing a member, listener, or controller, the InfoBus checks to see whether there are any remaining members, listeners, or controllers, and if there are not, the InfoBus instance is removed from the active list. This allows the InfoBus instance to be reclaimed during garbage collection.

If an application has a reference to an InfoBus instance that has been removed from the active list, this instance is referred as "stale." Any request for an InfoBus instance that has the same name as this stale instance receives a different instance returned to them, because only the active instances can be found.

Methods called on a stale InfoBus instance (such as join( ), addDataProducer( ), addDataConsumer( ), addDataController( ), or InfoBusMember.setInfoBus( )) will cause StaleInfoBusException to be thrown. When this RuntimeException is thrown, it generally indicates an error in the caller's code. For example, consider this code snippet:

myMember.joinInfoBus("myBus");
InfoBus myBus=myMember.getInfoBus( );
myMember.leaveInfoBus( );
myBus.addDataConsumer(myConsumer);

If the bus named "myBus" is not otherwise being used, adding a consumer would throw an exception when called, because the bus was released when leaveInfoBus( ) was called, so myBus refers to a stale InfoBus instance.

A Bean container might have a similar bug by holding a reference to a stale bus, as in the following example:

InfoBus beanBus=InfoBus.get("beanBus");
bean1.setInfoBus(beanBus); //this works ok
beanBus.release( );
//suppose bean1 leaves the bus on its own, then the following happens:
bean2.setInfoBus(beanBus); //this throws StaleInfoBusException In this case, "beanBus" becomes stale when bean1 leaves the bus, and beanBus refers to the stale bus. Setting the InfoBus on bean2 to beanBus throws StaleInfoBusException because beanBus is stale.

The get( ) method adds an artificial reference to the bus it gets to ensure that the bus does not go stale before join( ) is called. In a multi-threading environment, it is possible that after successfully getting an InfoBus instance, another thread could cause leave the same bus, in which case the InfoBus would be cleaned up if nobody else was using it. The artificial reference is added to prevent it from being cleaned up before allowing the original thread to join( ) it.

The artificial reference must be released by calling the release( ) method immediately after joining the bus. Although the artificial reference is removed, the bus is not cleaned up (and does not become stale) when it still has at least one current member, producer listener, consumer listener, or data controller in place. If the release( ) method is not called, the InfoBus instance will not be reclaimed, even when it has no other members, listeners, or controllers associated with it.

In the Bean container example above, should a different thread be scheduled immediately after calling InfoBus.get ("beanBus"), this thread might join then leave the same bus. Without the artificial reference, when the first thread tries to set bean1's InfoBus, it would throw an exception. The artificial reference guarantees that beanBus does not become stale until it is released.

In summary, most InfoBus applications will never see a stale InfoBus if they use InfoBusMemberSupport methods joinInfoBus( ) and leaveInfoBus( ) for joining and leaving the bus, and instead of keeping a reference to the bus they joined, they call methods on their bus by getting the current property value, as in this example:

myMember.getInfoBus( ).addProducer(myProducer)

The InfoBus class is not allowed to be subclassed in the Java virtual machine. Since subclassing is not possible, the behaviors that a JVM may wish to override are collected into an interface called InfoBusPolicyHelper; a default implementation of this interface is provided in a class called InfoBusDefaultPolicies.

The InfoBus plays a central role in membership. Most of the methods for membership are called by the InfoBusMemberSupport methods, not directly by applications. The InfoBus class is also central to the rendezvous and event model used in the InfoBus, and these InfoBus methods are described below.

All methods described in this section except for getName( ) are used by the InfoBusMemberSupport implementation class, and ordinarily are not called directly by most applications. Most InfoBus applications will join and leave the bus by way of InfoBusMemberSupport methods joinInfoBus( ) and leaveInfoBus( ). A bean container may need to use the get( ) method when it wishes to force a contained bean to be a member of a particular InfoBus, in which case it must call release( ) after setting the InfoBus property on the contained beans.

public static synchronized InfoBus get(Component component)

public static synchronized InfoBus get(String busName)

These methods are used to get a reference to an InfoBus instance that can be used directly for joining, as for an ordinary InfoBus bean or applet, or indirectly to force membership on InfoBus-aware beans, as for a builder environment.

One embodiment specifies the component to be used for determining the name of the default InfoBus to be used for the Component's context, and is the one typically used by ordinary applets and beans. The name is determined by rules established in InfoBusPolicyHelper.

A second embodiment uses a busName string as the name of the desired InfoBus to be specified. Named InfoBuses are useful for builder environments, classes that are not Components, and applications that wish to specify security constraints on particular buses by name. IllegalArgumentException may be thrown on an illegal name.

Whether the name is constructed by default or specified explicitly, both embodiments do their work by searching the existing InfoBus instances for a match and creating one if necessary. The reference to the found or created InfoBus is returned.

The get( ) method introduces an artificial reference to the InfoBus to ensure that the InfoBus instance is kept alive until a member joins it. This reference must be released by calling release( ) on the instance after completing the work (calls to join( ), setInfoBus( ), etc). Every get( ) must have a matching release( ), regardless of whether the work in between succeeds or throws an exception. See also the example in the join( ) method for this class.

The public synchronized void join(InfoBusMember member) throws PropertyVetoException method causes an InfoBusMember to join the specified InfoBus instance. It is generally used on an InfoBus instance returned by get( ). For example:

InfoBus x=get("my InfoBus"); //get named InfoBus x.join(myMember); //join it x.release( ); //release artificial reference When the join( ) method is called on a stale InfoBus instance, the StaleInfoBusException is thrown. It is preferred that applications use the higher-level InfoBusMemberSupport.joinInfoBus( ) methods instead of calling InfoBus.join( ).

The public synchronized void release( ) method is used for removing the artificial reference to an InfoBus instance set by calling get( ). It should be called immediately after at least one member joins the bus obtained by get( ). See also the example in the join( ) method. When this method is called, it checks to see whether the InfoBus instance is no longer used and allows it to be reclaimed through garbage collection if the instance has no members, listeners, or artificial references. In the common case where it follows a join( ) call, the InfoBus instance is not garbage collected because it has at least one member, i.e. the one that just joined.

InfoBus participants that use InfoBusMemberSupport.joinInfoBus( ) will typically not need to use this method. A Bean builder environment, however, would use get( ) and release( ) as brackets around calls that set the InfoBus property on their contained Beans.

The public String getName( ) method returns a String with the name of the InfoBus. When the InfoBus was created by name, the name is returned. When the InfoBus took the default name for the DOCBASE, the name derived from DOCBASE is returned.

The public void register(InfoBusMember member) method registers an InfoBusMember on the InfoBus's list of active members, and also causes the InfoBus to register itself as a PropertyChangeListener on the InfoBusMember's InfoBus property. It is called by InfoBusMemberSupport.setInfoBus( ), and is not typically called directly by an InfoBus participant. When this method is called on a stale InfoBus instance, the StaleInfoBusException is thrown. Member is a reference to the InfoBusMember to add to the active member list.

The public synchronized void leave(InfoBusMember member) throws PropertyVetoException method is called by implementations of InfoBusMember.leave when a member wishes to remove itself from the InfoBus it previously joined. It is preferred that InfoBus applications use the InfoBusMemberSupport methods joinInfoBus( ) and leaveInfoBus( ) instead of InfoBus methods join( ) and leave( ).

The public void propertyChange(PropertyChangeEvent event) method is called whenever an existing member has its "InfoBus" property changed by some means other than calling the leave( ) method, for example when a builder calls InfoBusMember.setInfoBus( ) to force it to talk to a different bus of its choice. InfoBus applications do not call this method directly. It is called by methods in InfoBusMemberSupport when a member is leaving a given InfoBus instance.

The InfoBusMember interface must be implemented by classes that want to join an InfoBus. Using an interface to define the methods ensures that any container of an InfoBusMember can know how to cause a member to join an InfoBus. The interface defines methods for joining and leaving an InfoBus, managing the "InfoBus" property via methods that conform to the Beans specification for a bound property of this name, and adding listeners for property changes on "InfoBus," as well as vetoable listeners.

To facilitate the implementation of this interface, a class is provided and is called javax.infobus.InfoBusMemberSupport, which provides all required methods and member data and which can be used directly by using the class as a data member. It is preferred that this class be used for the implementation, rather than implementing a unique one by the user.

The public void setInfoBus(InfoBus newInfoBus) throws PropertyVetoException method is called by InfoBus.join( ) to set the member data reference to newInfoBus during the processing of InfoBusMember.join( ). It can also be called by others that wish to force membership to a given InfoBus, such as by a builder tool that is arranging to have to applets talk over the same bus. Finally, it can be called with a null argument, such as in handling a call to InfoBusMember.leave( ).

The InfoBus requires that an implementation of this method does the following:

- Broadcasts a PropertyChangeEvent to its VetoableChangeListeners and PropertyChangeListeners.
- Explicitly uses the PropertyName "InfoBus" in creating the event.
- Does not use null for the PropertyName field (which is allowed in the Java Beans spec, for example if multiple properties change).
- Sets the InfoBusMember as the Event source.

The public InfoBus getInfoBus( ) method is an accessor for the current setting of the InfoBus property.

Two additional methods, public void addInfoBusVetoableListener (VetoableChangeListener vcl) and
public void removeInfoBusVetoableListener (VetoableChangeListener vcl), are called by a class that wishes to have a say about whether the "InfoBus" property for this class can be changed, to add or remove a vetoable listener object for the "InfoBus" property. Listeners should allow the InfoBus property to be set to null, which indicates a class that is leaving the InfoBus, often because the class is shutting down.

A class that wishes to be notified when the "InfoBus" property for this class is about to change calls the following methods:

public void addInfoBusPropertyListener (PropertyChangeListener pcl)
public void removeInfoBusPropertyListener (PropertyChangeListener pcl)

The methods add or remove a listener object to enable notification.

The InfoBusMemberSupport class provides code that can be used for implementing the InfoBusMember interface. Classes that implement the InfoBusMember interface can create an instance of this implementation class as member data, and expose the InfoBusMemberSupport methods to the outer class by creating a wrapper method. Some methods in this class (joinInfoBus( ), leaveInfoBus( )) are not required by the interface, but optional to the users of the class. The following example shows the wrapper for setInfoBus( ); other wrappers are similar to this approach:

```
class myMember implements InfoBusMember
{
    private InfoBusMemberSupport m_memberSupport = new
    InfoBusMemberSupport( this );
    public void setInfoBus(String name) throws PropertyVetoException
    {
        m_memberSupport.setInfoBus(name);
    }
// other wrapper methods go here
}
```

The public InfoBusMemberSupport(InfoBusMember member) method serves as a method constructor that sets the InfoBus reference member to null, and creates an instance of each of the VetoableChangeSupport and PropertyChangeSupport objects. The member parameter is a reference to the InfoBusMember instance that contains this InfoBusMemberSupport, and is used for property change notifications on the "InfoBus" property.

The Membership method is public synchronized void joinInfoBus(String busName) throws InfoBusMembershipException, PropertyVetoException The method provides for an InfoBusMember to get an InfoBus and join it. Following a successful return from this method, the InfoBus property has a reference to the bus to which this class belongs. The application can then add listeners to begin receiving InfoBus events. If this method is called when the member has previously joined a bus but has not left it, InfoBusMembershipException is thrown, and the membership is unchanged.

The public synchronized void leaveInfoBus( ) throws InfoBusMembershipException, PropertyVetoException method is called by an application after removing its event listeners when it is finished with a given InfoBus. It must be called before the application shuts down or before joining a different bus.

The protocol also includes methods to manage the "InfoBus" property. The public synchronized void setInfoBus (InfoBus newInfoBus) throws PropertyVetoException method is called to set the InfoBus property for a given member. Setting this property results in changes to membership: any prior membership is terminated, and if newInfoBus is not null, the member joins that bus. Any vetoable or property change listeners are notified about the change according to the standard rules. This method is typically called by a container application, such as a Bean builder environment, to cause InfoBus members it contains to be members of a particular bus.

PropertyVetoException is thrown when a VetoablePropertyListener on the member refuses to allow the change in membership. StaleInfoBusException is thrown when newInfoBus refers to InfoBus instance that is stale.

The public InfoBus getInfoBus( ) method implementation in this class returns the current value of the "InfoBus" property.

The public void addInfoBusVetoableListener (VetoableChangeListener vcl) and public void removeInfoBusVetoableListener(VetoableChangeListener vcl) are methods that call addVetoableChangeListener( ) or removeVetoableChangeListener( ) on a VetoableChangeSupport object in member data.

The public void addInfoBusPropertyListener (PropertyChangeListener pcl) and public void removeInfoBusPropertyListener(PropertyChangeListener pcl) are methods that call addPropertyChangeListener or removePropertyChangeListener on a PropertyChangeSupport object in member data.

For maximum flexibility, applets should accept a bus name as a parameter in the HTML tags and use it if found. If none is found, it should use the default InfoBus. InfoBus members should be prepared to have their "InfoBus" property changed by an outside class (such as a container). The InfoBusMemberSupport class provides this support.

Rendezvous

Figure 6:
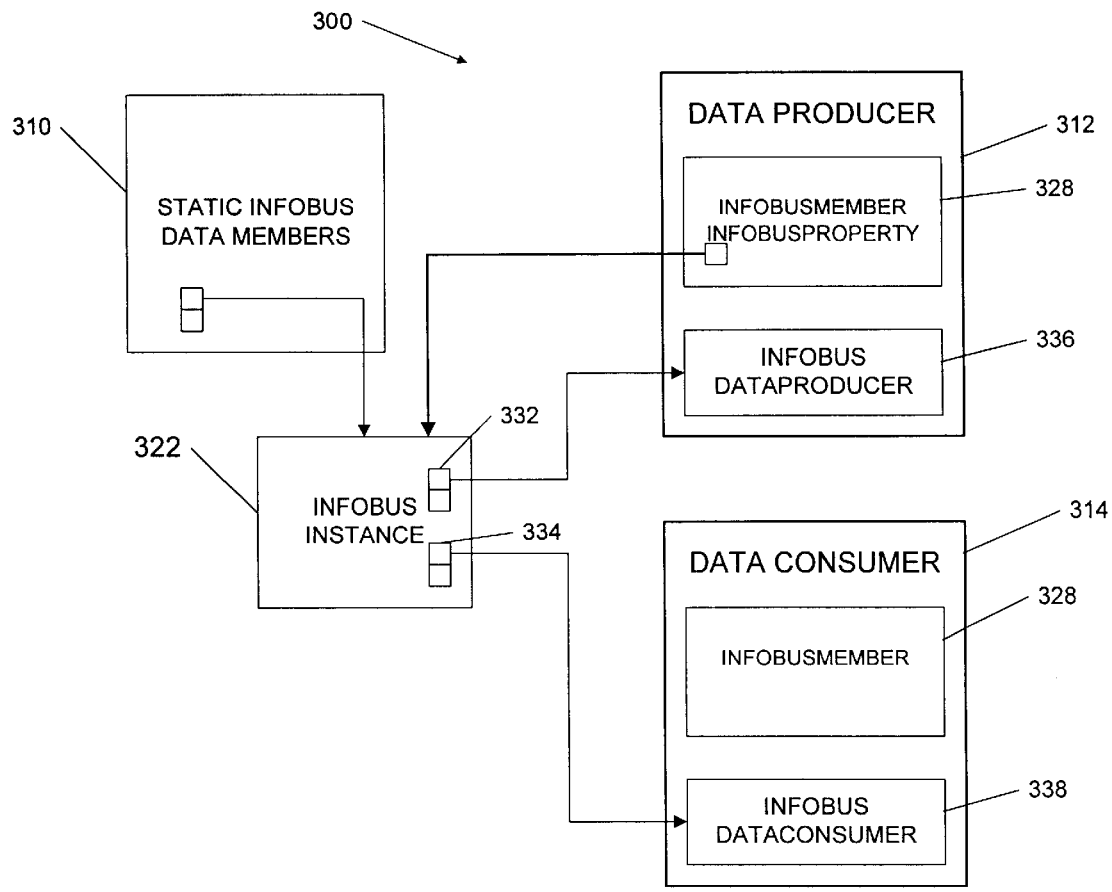
FIG. 6 illustrates conceptually an event receiving state on the InfoBus in accordance with the present invention.

This section describes the event-based mechanism used by InfoBus components to announce data availability and request data among other components on the bus. The negotiation for data is also referred to as the 'rendezvous.' FIG. 6 depicts a functional block diagram of the InfoBus 310 as shown previously in FIG. 3 where the producer 312 and a consumer 314 on bus 322 are ready to receive events. The same numbering used in FIG. 3 also applies to and is continued in FIG. 6. Events 343 are sent by the InfoBus 322 to listeners for each component on the bus. Three types of events are defined:

InfoBusItemAvailableEvent—an event that is broadcast on behalf of a producer to let potential consumers know about the availability of a new data item through the InfoBus.

InfoBusItemRevokedEvent—an event that is broadcast on behalf of a producer to let consumers know that a previously available data item is no longer available.

InfoBusItemRequestedEvent—an event that is broadcast on behalf of a consumer to let producers know about the need for a particular data item that they may be able to supply.

The three InfoBus events are subclasses of a common base class, each with methods needed for their particular task.

The InfoBus class provides methods that create and broadcast these event objects on behalf of producers and consumers, including fireItemAvailable( ) and fireItemRevoked( ) for use by producers, and findDataItem( ) and findMultipleDataItems( ) for use by consumers.

Once a class has joined an InfoBus, it needs to provide an event listener to the InfoBus in order to receive events from the InfoBus. InfoBus components are depicted as producer 312 or consumer 314 and listen for events to discover the availability or revocation of data items, or to hear requests for data items, or both. The InfoBus technology defines interfaces InfoBusDataProducer 336 and InfoBusDataConsumer 338 that extend InfoBusEventListener to indicate whether a component is a data producer, a data consumer, or both. The API details for InfoBusEventListener, InfoBusDataProducer, and InfoBusDataConsumer are described below. There are two event listeners lists provided. The first event list includes data producer event listeners 332 and the second event list includes data consumer event listeners 334.

Data producer 312 is an InfoBus participant that implements InfoBusDataProducer 336 to listen for requests and announces data availability or revocation by firing events on the bus. Data producer 312 calls addDataProducer( ) to begin receiving events. Applets typically do this in their start( ) method so they begin to receive events when the page is activated and call removeDataProducer in the stop( ) method. Following this protocol reduces overhead when the page is not active. With some browsers, however, it is possible to use an instance of the InfoBus for communication between applications on different web pages. The browser must not "prune" Java applets as pages are changed for this to work, and the InfoBus applications must not remove their listener on stop( ) in order to receive or send InfoBus events.

Producer events are generated by calling methods fireItemAvailable( ) and fireItemRevoked( ) on the InfoBus class, which send these events to registered consumers. The producer 312 handles request events via dataItemRequested( ). If the producer 312 can provide the requested data, it stores a reference to the data item by calling setDataItem( ) on the event, otherwise it simply returns.

Data consumer 314 is an InfoBus participant that implements InfoBusDataConsumer 338 to listen for availability and revocation events, and requests data items by firing events on the bus. Similar to producer mechanism 312, it controls events by calling addDataConsumer( ) and removeDataConsumer( ). Data consumer 314 finds out about new data by handling dataItemAvailable( ) and revocation of announced data by handling dataItemRevoked( ). It decides whether it is interested in the data by inspecting the data item name or data flavors obtained from the event via getDataItemName( ) or getDataFlavors( ). If it wants the data, it can obtain it directly from the producer by calling requestDataItem( ) on the event.

Data consumer 314 can request a data item by name even if it has not been announced by a producer 312. For example, findDataItem( ) can be called to find a data item by name.

Such blind requests are often required when a consumer initializes, in case producer 312 announced the data item before consumer 314 had completed initialization. If the data is unavailable from any producer, null is returned to the caller.

If more than one registered producer 312 is capable of producing the data, the first one that supplies the data item satisfies the request. A consumer 314 can call findMultipleDataItems( ) to get data items from all registered producers that are capable of supplying the data, and choose for itself which one it will take.

A component can be both a producer 312 and a consumer 314 by implementing InfoBusDataProducer 336 and InfoBusDataConsumer 338. An applet might do this to filter data or translate it to a new form for a consumer 314.

Producers 312 and consumers 314 cannot directly create and broadcast events to others on the bus because the constructors for events are not public and because producers 312 and consumers 314 do not have access to the other producers list 332 and consumers list 334. The InfoBus 310 intentionally prevents the use of custom events, since event traffic on the bus limits scalability.

Data controllers 316 do have the ability to send events to producers 312 and consumers 314 if they choose to allow to mediate the flow of events among other components. Data controllers 316, however, use a different mechanism for handling events from consumers and producers, and are therefore not event listeners themselves.

FIG. 6 shows a producer 312 and a consumer 314 just after they have provided event listeners 332, 334 to the InfoBus instance 322 to which they belong. The InfoBus instance 322 has a list of consumer listeners 334 and a list of producer listeners 332 that is separate from other InfoBus instances in order to control the scope of conversations between applets and to reduce traffic. Although the membership connections and change listeners of FIG. 3 are not shown in FIG. 6, they are still part of the overall bus structure and are eliminated for simplicity in FIG. 6.

FIG. 6 shows applications that have only one InfoBusEventListener associated with each InfoBusMember. They are not combined into one interface as it is often convenient for an application to have more than one event listener, each specialized to a particular data item of interest. InfoBus components can register as many event listeners as they need. For example, consider a shared technology that supports the notion of the currently active selection by way of a dataitem called "CurrentSelection." The provider of this item is likely to be in a different class than, for example, the provider of a collection of cells, and the use of multiple event listeners makes structuring the classes more convenient.

Security during the data exchange or rendezvous process can be approached from two granularities: security checks before permitting joining an InfoBus instance constitute a large-grained approach, while security checks upon delivery of an InfoBusEvent to a producer or consumer constitute a fine-grained approach.

The fine-grained security approach occurs in the producers and consumers themselves. In one example, a producer creates a data access permission akin to the FilePermission class, with system security policy files that enumerate classes that have that access permission. When this producer receives an InfoBusItemRequested event, it can call the AccessController's checkPermission method to verify that all objects in the call stack—which will include the requesting consumer—have the necessary access permission before releasing data.

Consumers that wish to implement this kind of fine-grained permission checking need to take the additional step of implementing the javax.infobus.SecureConsumer interface. Without the SecureConsumer interface the data that a consumer requests is returned by the InfoBus and the producer providing that data has no presence in the call stack. By implementing SecureConsumer, each producer that returns data is actually calling the SecureConsumer.setDataItem( ) method, allowing the SecureConsumer to perform an AccessController checkPermission( ) before accepting and processing the data.

The InfoBusPolicyHelper provides the methods necessary to implement the large-grained approach: for each of the supported actions, there is a matching InfoBusPolicyHelper call that is made before executing the request.

Performing the rendezvous checks by default produces unwanted overhead in code execution as well as overhead in management of system security policies. The InfoBusPolicyHelper checks done during membership processing, combined with fine-grained checks done by individual consumers and producers during rendezvous, are a sufficient and optimal means of creating a secure InfoBus application. Systems that wish the additional layer of security described here as large-grained rendezvous checks have the means of implementing it by providing a custom policy helper.

An InfoBus participant should create classes that implement InfoBusDataProducer 336 and InfoBusDataConsumer 338 separately from one that defines other methods or implements other interfaces, especially InfoBusMember 328. This separation is provided because the listener interfaces are available from events and data items and introspection allows access to other methods available on these objects. In particular, if InfoBusMember 328 is in the same class, it would allow access to setInfoBus( ), which a malicious application could use to force a member onto a different bus.

Data items can be announced as available by name and consumers can request data items by name. Data items can be named using the recommended naming conventions described in this section, based on Universal Resource. However, data items are not required to follow these conventions. The only requirements for data item names are:

No data item name can begin with the '%' character, which defines a reserved space for data item names.

If the data item name starts with "infobus:" or "/", the same as a URI does, it must follow all of the rules for the convention.

It should be possible to name data items by way of applet parameters, the UI, or both.

URI-Based InfoBus Naming Convention

<infobus_uri>::=<abs_infobus_uri>|<rel_infobus_uri>

<abs_infobus_uri>::=<infobus_scheme>':'<rel_infobus_uri>

<infobus_scheme>::='infobus'

<rel_infobus_uri>::='/'<infobus_name>{<producer_id>'/'<infobus_data_item_name>

<infobus_name>::=<unreserved>*

<producer_id>::='/'<producer_class>{'/'<producer_discriminator>}*

<producer_class>::=fully-qualified Java class name (with dot separators)

<producer_discriminator>::=<unreserved>*

<infobus_data_item_name>::=<unreserved>*

<unreserved>=ALPHA|DIGIT|safe|extra

<extra>='!'|''''|'('|')'|','

<safe>='$'|'-'|'_'|'.'

These notes apply to item names, though they are not suggested by the BNF description above:

The infobus_name is the one specified for a named InfoBus, or when using a default name for a DOCBASE, can be obtained by calling myMember.getInfoBus( ).getName( ). Note that infobus_name cannot begin with '-', and the use of '%' as the leading character is reserved.

The producer_class is a qualified Java class name with dot separators, like com.lotus.esuite.sheet.

DataFlavors and the MIME type strings they expose can be used to describe data items provided in the InfoBus rendezvous. This is helpful to the consumer to determine before requesting data from an available event whether it can make use of it. This is helpful to the producer to determine whether it can supply the data in response to a request event in a useful form.

In announcing the availability of a data item, a producer can supply an array of DataFlavors available for the item by way of a parameter on the InfoBus.fireItemAvailable( ) method. The value of this parameter, whether a reference to an array or just null, is available to the consumer by way of InfoBusItemAvailableEvent.getDataFlavors( ). The flavors are the union of the groups listed above.

Similarly, a consumer can indicate its preferred format for a data item by providing an array of DataFlavors, ordered by preference, on the InfoBus.findDataItem( ) and findMultipleDataItems( ) methods. The value of this parameter, whether a reference to an array or just null, is available to the producer by way of InfoBusItemRequestedEvent.getDataFlavors( ). Because this is a hint to the producer, and the producer may supply an item that is not one of the preferred flavors, the consumer must code defensively to ensure that it has an item of a type it can use, for example by using the instance of operator.

The InfoBus class is involved with membership and with rendezvous. The membership methods have already been presented. The InfoBus methods used to manage event listeners are now presented.

```
public synchronized void addDataProducer
    (InfoBusDataProducer producer)
public synchronized void removeDataProducer
    (InfoBusDataProducer producer)
public synchronized void addDataConsumer
    (InfoBusDataConsumer consumer)
public synchronized void removeDataConsumer
    (InfoBusDataConsumer consumer)
```

These methods add or remove event listeners from the list of data producers or data consumers maintained by each InfoBus instance. The add methods should be called after the component has joined a bus. After adding an event listener, the class will begin to receive requests from data consumers on the same bus. If the add methods are called on a stale InfoBus instance, the StaleInfoBusException is thrown.

The remove methods must be called to remove all listeners before shutting down the application to release references from the InfoBus to the application class and to allow the InfoBus instance to be released.

InfoBus methods are used by producers, consumers, and data controllers to fire events. The first method in each group is one that is used by a producer or consumer to fire an event. This method actually defers the distribution of events to registered data controllers, or the default controller if no data controllers are registered; data controllers must not call this method.

Each event group also has methods to fire events to a specific target or a Vector of targets. Events fired with these methods are delivered directly to the indicated targets, not to other controllers. These methods can be called by data controllers, and must not be called by data producers or consumers.

Any method that fires events (including the 'find' methods) can throw java.security.AccessControlException. Because this is a runtime exception, the use of 'try . . . catch' clauses is optional.

The InfoBus unites multiple components that work together as one application. Each InfoBus component must be aware that their code may execute in a multithreaded fashion, even when they do not spawn threads themselves, since they may be called from other components that do use multiple threads. The InfoBus requires that when an available event for a particular data item name and producer is fired, it must be received by all listeners before the corresponding revoked event (i.e., a revoked event from the same producer with the same data item name) is fired. To meet this requirement the producer must temporarily disable its ability to send the corresponding revoked event by using synchronization techniques appropriate for multithreaded operation before firing the available event.

This can be accomplished using a synchronization block around code that fires available and revoked events. In implementing this, a component must not specify its InfoBus as the parameter to the Java synchronized keyword as this can cause a deadlock to occur.

The public void fireItemAvailable(String dataItemName, DataFlavor[] flavors, InfoBusDataProducer producer) method is called by producers to create an instance of InfoBusItemAvailableEvent and send it to data consumers on the bus, indicating the dataItemName and its producer. Producers can specify the flavors of data they can supply, or use null if they don't care to describe the data. Consumers can examine the offered flavors and decide whether they can use the data, or decide after requesting the data. Data controllers must not call this method.

The public void fireItemAvailable(String dataItemName, DataFlavor[] flavors, InfoBusDataProducer source, InfoBusDataConsumer target) and public void fireItemAvailable (String dataItemName, DataFlavor[] flavors, InfoBusDataProducer source, Vector targets) methods are designed for use by data controllers. The first method creates an InfoBusItemAvailableEvent and delivers it to target. The second method creates a single InfoBusItemAvailableEvent and delivers it to all consumers specified in the Vector targets. All elements specified in targets must implement InfoBusDataConsumer. The targets Vector is copied by the InfoBus before distribution begins.

The public void fireItemRevoked(String dataItemName, InfoBusDataProducer producer) method is called by producers to create an instance of InfoBusItemRevokedEvent and send it to data consumers on the bus, indicating the dataItemName and its producer. Data controllers must not call this method. Producers should call this method when a data item that has been announced as available will no longer be available.

The public void fireItemRevoked(String dataItemName, InfoBusDataProducer source, InfoBusDataConsumer target) and public void fireItemRevoked(String dataItemName, InfoBusDataProducer source, Vector targets) methods are designed for use by data controllers. The first method creates an InfoBusItemRevokedEvent and delivers it to target. The second method creates a single InfoBusItemRevokedEvent and delivers it to all consumers specified in the Vector targets. All elements specified in targets must implement InfoBusDataConsumer. The targets Vector is copied by the InfoBus before distribution begins.

The public Object findDataItem(String dataItemName, DataFlavor[] flavors, InfoBusDataConsumer consumer) method is called by consumers to create an instance of InfoBusItemRequestedEvent and send it to data producers on the bus, indicating the dataItemName and consumer that wants it. The consumer can specify its preferred flavors or just say null.

The event is sent to each registered producer until a producer supplies a data item, at which time the data item is returned to the caller. The order of polling the data producers for such requests is indeterminate. If no producer satisfies the request, the method returns null to indicate that the requested data item is not available. Because data controllers control the distribution of this type of event, they must not call this method.

The public Object findDataItem(String dataItemName, DataFlavor[] flavors, InfoBusDataConsumer consumer, InfoBusDataProducer target) and public Object findDataItem(String dataItemName, DataFlavor[] flavors, InfoBusDataConsumer consumer, Vector targets) methods are designed for use by data controllers. The first method creates an InfoBusItemRequestedEvent and delivers it to target, then returns a response to the request or null if target does not fill the request.

The second method creates a single InfoBusItemRequestedEvent and delivers it to the producers found in the targets Vector until one producer responds by filling the request or all producers have been queried. The method returns the response object if a producer filled the request, or null if no producer responded. All elements specified in targets must implement InfoBusDataProducer. The targets Vector is copied by the InfoBus before distribution begins.

The public Object[] findMultipleDataItems(String dataItemName, DataFlavor[] flavors, InfoBusDataConsumer consumer) method creates an instance of InfoBusItemRequestedEvent and sends it to all data producers on the bus, indicating the dataItemName and the consumer that requested it. The consumer can specify its preferred flavors or just say null.

Each data item supplied by a producer is stored in an array, which is returned to the caller. If no producers offer the requested data item, this method returns null.

The InfoBusEvent class is the base class for InfoBus events used for a rendezvous to provide a data item from a producer to a consumer. Subclasses are defined for each event type for the purpose of determining the event type via the Java "instanceof" operator.

The public String getDataItemName( ) method is an accessor that allows an event handler to look at the data item name to see if it can produce or use the named data item.

The InfoBusItemAvailableEvent class is sent on behalf of a data producer to announce the availability of new data to all data consumers that have joined a given InfoBus instance. A producer creates and broadcasts the event by calling InfoBus.fireItemAvailable( ). Because the constructor is package access, the event cannot be created directly by an application.

The public Object requestDataItem (InfoBusDataConsumer consumer, DataFlavor[] flavors) method can be called by a consumer to request a data item announced by way of the InfoBusItemAvailableEvent. The method creates an InfoBusItemRequestedEvent and sends it directly to the producer that announced the item. The producer returns a reference to the item. When flavors is not null, it specifies an array of flavors the consumer can use. The producer may decide not to return an item if it cannot provide it in one of these flavors.

The public InfoBusDataProducer getSourceAsProducer( ) method returns a reference to the source of the event, i.e. the event handler of the producer that generated the InfoBusItemAvailableEvent. The source of available events is always an InfoBusDataProducer. Event.getSource returns an Object reference to the producer. The consumer can use the reference to the producer to uniquely identify the producer of an announced item.

The public DataFlavor[] getDataFlavors( ) method allows a consumer to consider the type of information being announced as available before requesting a data item. It returns a reference to array of DataFlavor objects that describe the formats the producer can provide either in the data item itself, or by way of Transferable.getTransferData( ). If this method returns null, it means the producer did not specify the DataFlavors in announcing this data.

The InfoBusItemRevokedEvent class is sent on behalf of a data producer to announce the revocation of a previously announced item. It is used by consumers, who should release their reference to the item if they hold it, and controllers, who may wish to update a list of currently available items. Additionally, all items announced as available should have a matching revoked announcement. In addition to sending an InfoBusRevokedEvent, the revoked change event should be sent to data item change listeners.

The event is created and broadcast by calling InfoBus.fireItemRevoked( ). Because the constructor is package access, the event cannot be created directly by an application.

The public InfoBusDataProducer getSourceAsProducer( ) method returns a reference to source of the event, i.e. the event handler of the producer that generated the InfoBusItemRevokedEvent. The source of revoked events is always an InfoBusDataProducer.

The InfoBusItemRequestedEvent class is sent on behalf of a data consumer to find a named data item it would like to receive. For example, when an applet is starting, it cannot know whether a given data item has been announced, so it asks for the item by calling one of the find methods in InfoBus, which generate this event. Because the constructor is package access, the event cannot be created directly by an application.

The public void setDataItem(Object item) is a method accessor that the data producer uses to set a data item it is supplying in response to the request event. If the source of this RequestedEvent is an InfoBusSecureConsumer, the call to setDataItem( ) will also call the SecureConsumer's setDataItem( ) method to permit the SecureConsumer to perform permission checks and determine trustworthiness of the responding producer. SetDataItem( ) is a write-once method: if the data item in the event is non-null, it cannot be overwritten. The field will be null [writable] when the RequestedEvent is first delivered to a producer.

The public Object getDataItem( ) is an accessor that is used by the InfoBus or a data controller to get a reference to the data item previously set by a data producer via setDataItem( ). If no producer responded to the event, calling this method will return null. The method is also used in the implementation of InfoBus.findMultipleDataItems to get each data item available from the data producers on a given InfoBus instance.

The public InfoBusDataConsumer getSourceAsConsumer( ) method returns a reference to the source of the event, i.e. the event handler of the consumer that generated the InfoBusItemRequestedEvent. The source of request events is always an InfoBusDataConsumer.

Figure 7:
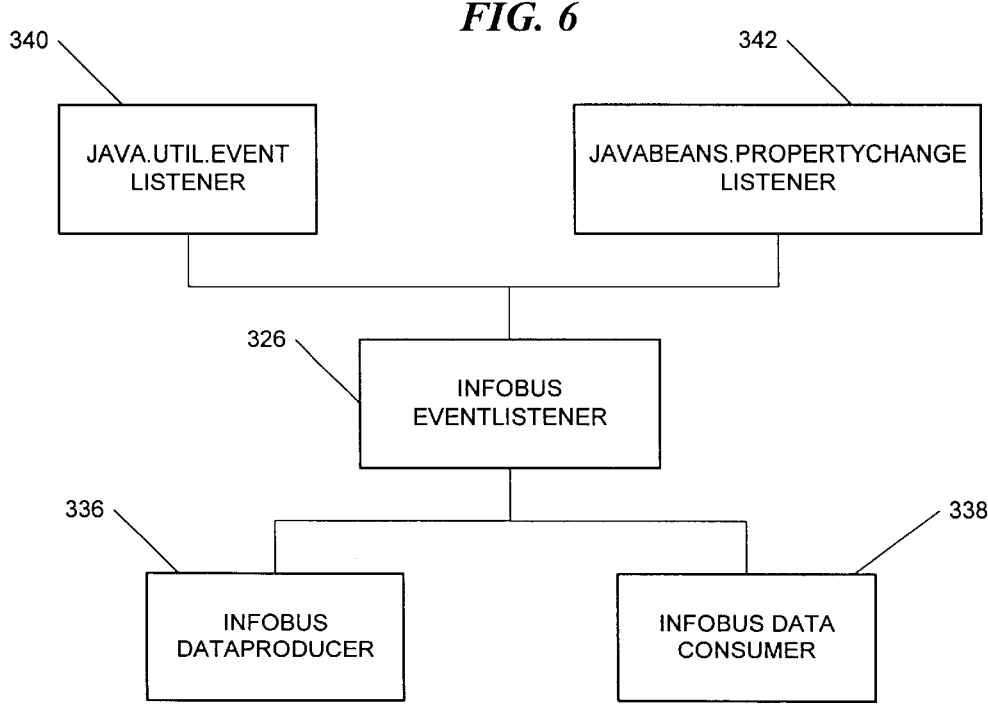
FIG. 7 illustrates conceptually the interface hierarchy for InfoBus event listeners in accordance with the present invention.

The public DataFlavor[] getDataFlavors( ) method exposes the DataFlavors that the consumer prefers, as a hint to producers that can supply data in more than one format. If this method returns null, the consumer did not provide any DataFlavor preferences when it requested the event. The consumer may specify Mime types in the order it prefers, including InfoBus and standard Mime types. The Mime string application/x-java-infobus; class-javax.infobus.DataItem indicates that a consumer will accept any type of InfoBus access interface available for the item. Flavors are a hint to the producer, which is not required to consider the requested DataFlavors in supplying the data item The InfoBusEventListener interface extends java.util.EventListener 326 and java.beans.PropertyChangeListener 342 to serve as a base class for the data producer and data consumer interfaces. FIG. 7 shows the class hierarchy for these interfaces. Each event listener 336, 338 must be registered with the InfoBus instance 322 after joining it in order to receive events; this is accomplished by calling InfoBus.addDataProducer or addDataConsumer, as appropriate for the type of event listener interface. An object that serves as both consumer and producer would add itself via both add methods. The listener should be added during the applet's start( ) method (or its moral equivalent) and removed during the applet's stop( ) method in order to reduce event traffic when the browser switches to a different page.

The public void propertyChange(PropertyChangeEvent event) method is called whenever the member associated with this producer or consumer has its "InfoBus" property changed by a means other than calling the leave method, for example when a builder calls InfoBusMember.setInfoBus( ) to force it to talk to a different bus. The method is inherited from PropertyChangeListener. The desired implementation includes:

Check event.getPropertyName( ) is "InfoBus" and event.getSource( ) is your parent InfoBusMember.

If the event.getOldValue( ) is not null, call event.getOldValue( ).removeDataProducer( ) to stop listening to the old InfoBus instance.

If the event.getNewValue( ) is not null, call event.getNewValue( ).addDataProducer( ) to listen for events from the new InfoBus instance.

An InfoBusDataProducer interface is provided that extends InfoBusEventListener and is implemented by classes that wish to serve as a data producer. A class that implements this interface should be registered with the InfoBus via addDataProducer( ) during the applet's start( ) method (or the moral equivalent if not an applet), and removed via during the applet's stop( ) method.

The public void dataItemRequested (InfoBusItemRequestedEvent event) method is called by the InfoBus class on behalf of a data consumer that is requesting a data item by name. The desired implementation:

check the data item name (obtained via event.getDataItemName( )) to see if it is an item that can be supplied by this producer. If not, return.

optionally, call AccessController.checkPermission( ) to determine permissions to decide whether to provide the item to the caller.

create an instance of the data item, or get a reference if it already exists, and set it via event.setData Item( ).

A InfoBusDataConsumer interface is provided that extends InfoBusEventListener and is implemented by a class that wishes to serve as a data consumer. The class should be registered with the InfoBus via addDataConsumer( ) during the applet's start( ) method (or the functional equivalent if not an applet), and removed during the applet's stop( ) method.

The public void dataItemAvailable (InfoBusItemAvailableEvent event) method is called by the InfoBus class on behalf of a data producer that is announcing the availability of a new data item by name. A consumer that obtains a data item from a producer should be prepared to release it when the producer announces that the item is being revoked via InfoBusDataConsumer.dataItemRevoked( ). The desired implementation:

- Optionally, call AccessController.checkPermission( ) to determine permissions in deciding whether to request the item from the producer.
- Check the data item name (obtained via event.getDataItemName( )) to see if the item is wanted. If not, return.
- Get a reference to the data item by calling the event.requestDataItem( ) method.
- If desired, and if a DataItemChangeManager is present, set a DataItemChangeListener on the data item.

The public void dataItemRevoked (InfoBusItemRevokedEvent event) method is called by the InfoBus class on behalf of a data producer that is revoking the availability of a previously announced data item. A consumer that is using this data item should release it upon receiving this notification. The desired implementation:

- Check the data item name (obtained via event.getDataItemName( )) and the producer sending the event (obtained via event.getSourceAsProducer( )) to see if this is an item held by this consumer. If not, return.
- Remove any change listeners set on this data item.
- Release all references to the data itemheld by this consumer Data Items The next element with the InfoBus protocol is the Data items and how they are managed within the system. Data items are any Java Object passed by reference from a producer to a consumer by way of a request event, and any sub-items when collection interfaces are used. The InfoBus API defines a data item transfer object as an Object for maximum flexibility and compatibility with the JDK Collection classes. The InfoBus API defines several interfaces to add InfoBus-standard functionality to the data items:

- The DataItem interface provides descriptive and identifying information about the data item itself.
- The DataItemChangeManager interface manages DataItemChangeListeners from consumers.
- The DataItemView interface provides methods to manage a view associated with an item.
- The awt.data-transfer.Transferable interface provides an alternate access mechanism for data in another standard format.
- A variety of standard access interfaces can be implemented by a data item to provide application-independent access methods for consumers to navigate and retrieve data from the item.

A consumer can examine a data item using the instanceof operator (or catch a cast exception) to discover whether a given interface is available on the item. For example, the consumer can find out whether change notifications are available on a given data item by testing for an instanceof DataItemChangeManager.

Figure 8:
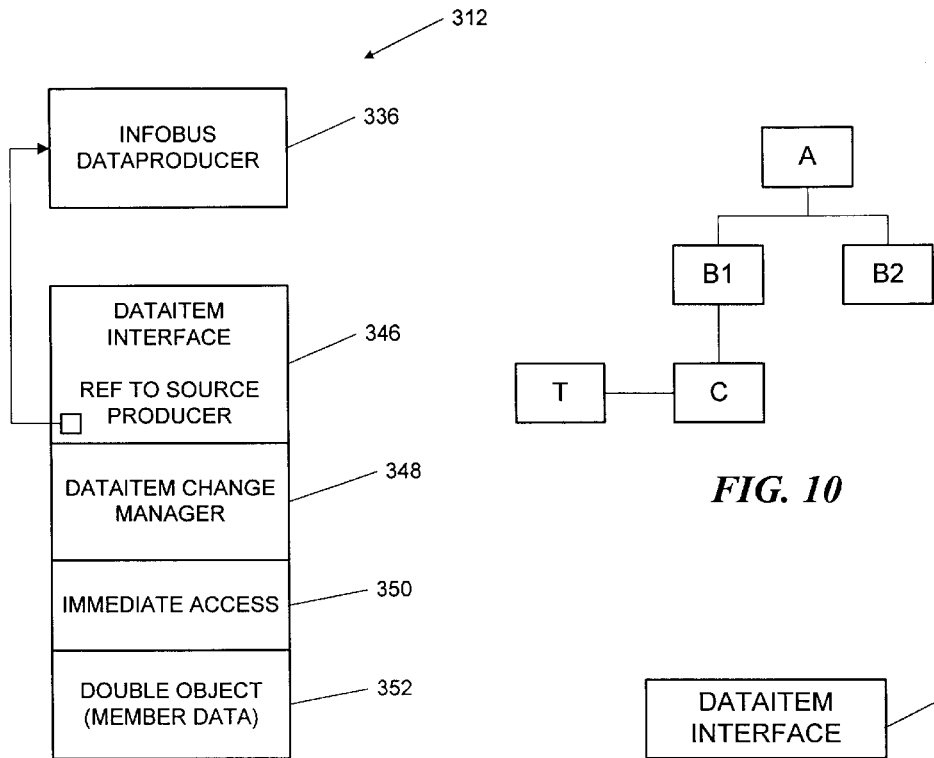
FIG. 8 illustrates conceptually a data item structure in accordance with the present invention.

Data items can be a single-valued Object wrapper using the ImmediateAccess interface. FIG. 8 illustrates the "CurrentTime" data item in TimeSource sample application. A data producer implements a data item 346 to identify and describe the data. The data producer implements a DataItemChangeListener 1214 to notify consumers of changes. A Double object, which represents the current time, is a member data 352. The consumer can access the member data item using methods provided by the ImmediateAccess 350 implementation. A data item class definition looks like this:

```
class CurrentTimeItem
    implements DataItem, DataItemChageManager, ImmediateAccess
{
    Double time = new Double(0);
    // methods for DataItem
    // methods for DataItemChangeManager
    // methods for ImmediateAccess
};
```

To access the Double object contained in the member data 352 of the CurrentTimeItem instance, the ImmediateAccess.getValueAsObject( ) method can be called. The reference to the Double is returned, allowing calls to methods on that object, as described in java-.lang.Double. The ImmediateAccess interface 350 also defines a method to return a string rendering of the Double. The Clock sample consumer uses this method for getting a formatted time string from the producer.

For many data items, the data object could be a part of the inheritance hierarchy, in which the class declaration above would extend the data object. This is possible when the data object is not declared as a final class. In such cases, getValueAsObject( ) simply returns this.

TimeSource and Clock are intended to be simple examples of a producer and consumer applet. In real-world examples, data items will often contain more interesting data structures, such as a collection of other data items, using various collection interfaces to provide rich structuring of a complex data set.

Figure 9:
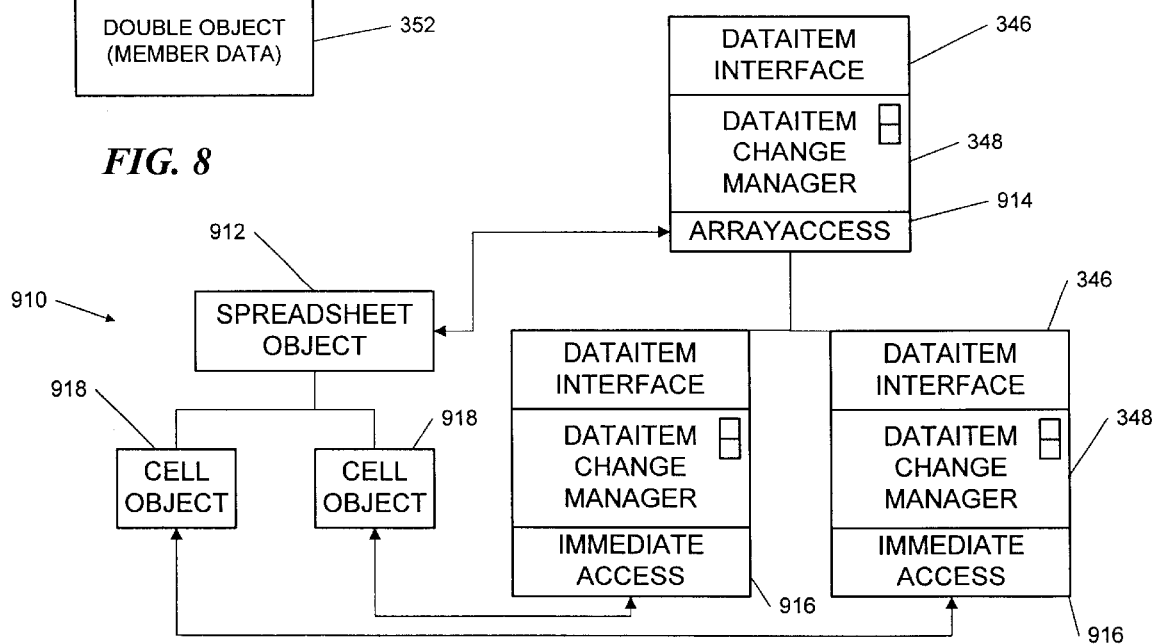
FIG. 9 illustrates an InfoBus object model for a spreadsheet.

FIG. 9 shows InfoBus objects in a spreadsheet producer 910, which provides access to a collection of cell objects 918 by way of the ArrayAccess interface 914 and is modeled after the producer 312 of FIG. 8. The getItemByCoordinates( ) method returns an ImmediateAccess item 916 to provide access to a given cell's data found in cell objects 918. Spreadsheet object 912 offers change notifications at both the sheet and cell level. A spreadsheet producer might also implement a Collection to provide access to various ranges of cells (not shown in the picture).

Spreadsheet data structures generally contain a lot of information that are used for internal purposes and would not be provided to consumers, for example a formula used to calculate the value of a cell. They can also be large, and contain many cells and ranges. This has two important implications in implementing the model.

First, applications of this size will generally not carry copies of their data in the various data items they expose, because it is time-consuming and wasteful of resources. Instead, an access interface serves as a proxy for accessing the data from the internal representation of the sheet, and carries a means of getting the data (e.g., a reference to the cell in the internal representation) rather than a copy of the data.

Second, it is generally inefficient to create data items for all cells when the ArrayAccess data item is created. Instead, ImmediateAccess data items for cells should be created on demand and released when no longer needed.

DataItem interface 346 provides identifying and descriptive information about a data item. Well-behaved InfoBus producers must implement this interface on the top-level data item being exchanged. For multi-level data items, such as a Collection of data items, implementing DataItem for items at every level is recommended.

The public Object getProperty(String propertyName) method returns a property or metadata information about the item, as indicated by property Name. One property is recommended for DataItems at the top-level: the "Name" property must provide the data item name that was used for announcement or request in the rendezvous process. This does not apply to nameless DataItems, i.e. those below the rendezvous point of a hierarchical data item. Support for other properties is optional; null should be returned for unsupported properties. Property names should not contain the '*' character.

The public InfoBusEventListener getSource( ) method returns a reference to the creator of this data item. This method should return a reference to the InfoBusEventListener (usually an InfoBusDataProducer) used for rendezvous of this item as their source.

Data items can also be supplied by a consumer to the producer, for temporary use in changing mutable data items (to provide to the producer a means of accessing the new value). In this case the source of the temporary item is an InfoBusDataConsumer. null is not a permissible return value from this method.

The public void release( ) method allows a producer to know when a consumer has finished using a data item. Consumers are required to call this method when they are about to drop their last reference to an item or anything obtained directly or indirectly from the item, including subitems and transfer data (from Transferable.getTransferData( )). Producers may optionally manage resources for data items in their implementation of this method.

A DataItemView interface is provided for producers to implement to optimize the management of a view of the contents of a particular subset of records. The view represents the window of data that is currently visible to the consumer. For example, a consumer of an object that implements ScrollableRowsetAccess and DataItemView can paint the cells in a grid view of a subset of its rows. As the view is scrolled, the items in the view change as new rows appear. Without the use of this interface, the view can be populated by changing the current row of a ScrollableRowsetAccess to get values to be displayed for each row in the view, but this can be time-consuming.

The ViewStart property indicates the number of the row in the row set that is seen as the first row of the view. There is no relationship between the current row of the rowset and the ViewStart; it is possible to scroll the view without affecting the current row, or change the current row without scrolling the view.

It is possible for a view to contain fewer rows than specified in getView( ). Similarly, when scrolled to the end, the view may end up with fewer rows than were originally requested for viewSize. A similar situation can occur when rows are deleted from a rowset. In these cases, the ArrayAccess obtained from getView( ) must indicate the number of rows actually in the view from dimension[0] are returned by getDimensions( ). Attempts to access items beyond this dimension must cause IndexOutOfBoundsException to be thrown.

This use of this interface is optional: producers can implement it or not as they choose; consumers may use it or not if it is present.

The public int getViewStart( ) method returns the current value of the ViewStart property. The public void setViewStart(int absoluteRow) method sets ViewStart to absoluteRow. The absoluteRow should be greater than or equal to zero. The public void scrollView(int relativeAmount) method changes ViewStart by relativeAmount relative to its current position. relativeAmount is negative to move backwards, or positive to move forward. The public ArrayAccess getView(int viewSize) method returns a two-dimensional ArrayAccess object that represents a row and column view with viewSize rows. The array must be two-dimensional, corresponding to row and column numbers in the view, respectively. The ArrayAccess should be read-only; an attempt to set a new value must throw UnsupportedOperationException.

Sub-items returned by this ArrayAccess must be ImmediateAccess items that correspond to the current view to provide standard access to the values in each sub-item. If the ViewStart property changes, the values returned by items in the array change so that the view maps to a different range of rows in the row set.

For example, if DataItemView were implemented on a RowsetAccess object, and an ArrayAccess was obtained by calling this method, and ViewStart is 0, getting the item at coordinate [1,2] of the array returns the item at row 2, column 3 in the row set. If the consumer calls scrollView(5), ViewStart changes to 5, and the value of item [1,2] changes to be the value at row 7, column 3 in the row set.

A Transferable interface can optionally be implemented on any data item at any level. The Transferable mechanism provides an alternative to the access interfaces for accessing one or more JDK-standard formats for a data item. Using this mechanism it is possible to achieve essentially a dynamic clipboard implementation. The Transferable object exposes the data items DataFlavors, as described in java.sun.com/products/JDK/1.1/docs/api/Packagejava.awt.datatransfer.html When the producer wishes to share a Transferable implementation that can work for more than one data item, it can carry a reference to the implementation, and delegate Transferable method calls directly to that object.

When implementing Transferable.getTransferDataFlavors( ), the returned array must include only those MIME types for data that can be accessed via Transferable.getTransferData( ).

When Transferable.getTransferData( ) is used to get data in a particular data flavor, the reference handed back counts as one of the references that must be released prior to calling DataItem.release( ) at any point above the Transferable object.

InfoBus access interfaces do not provide an explicit locking API. Producers can lock a given class instance in the implementation of access methods using synchronized methods or blocks as needed.

Some data items require a critical resource to be allocated by the producer. For example, a data access component may allocate a system resource on a database server that must be released when it is no longer needed. Such producers will typically track the consumers that have requested data items associated with the resource, for example by count or by handing out separate instances of the data item access object, and release the resources when the last consumer indicates that it has finished using the resource. The DataItem.release( ) method is designed to provide an indication to the producer when a given consumer has finished using a data item.

Consumers are required to call the DataItem.release( ) when they are finished using any object obtained directly or indirectly from the data item, including objects returned by Transferable.getTransferData( ). After a consumer calls this method, it must not make any further calls on the DataItem or its sub-items, and should drop its reference (for example, if it's member data, set that member reference to null). When release( ) is called for any DataItem, it means that the consumer is finished with the item at that level and all subitems it may have. When a consumer passes around a data item references among various objects it manages, it must track its use of the references so that it knows when the last reference is dropped.

The consumer may optionally look for sub-items that implement DataItem and release these when they are no longer needed. This is a good idea for large, multi-level collection data items.

Requirements needed by the Producer are now described. DataItem is required for all top-level (rendezvous) data items, and is optional for all sub-items in a collection hierarchy. The producer is required to provide an implementation of release( ) for each object that implements DataItem. However, DataItem.release( ) is only a hint to the producer, and it can use any strategy it chooses for managing associated resources, or provide an empty implementation to ignore the hints.

A producer may decide to manage resources at the top-level data item, or at all levels of the collection hierarchy, or not at all, according to its own requirements. In a multi-level collection hierarchy which contains a DataItem at more than one level, calling DataItem.release( ) at any level means that that node and all nodes below it are released; calling release( ) on the top-level DataItem releases the entire data item for the consumer that called it.

When a producer supports the release of resources, it must do so in such a way that when one consumer calls release( ), it will not affect other consumers who hold a reference to any part of the same data item. Of course, because a producer manages the lifetime of a data item, it can revoke it at any time it chooses, but ideally it aims to minimize disruption to consumers. In any case, when a producer does release resources associated with a data item, it should always send a DataItemRevokedEvent to listeners of the item, and if it is a top-level item, it should also send an InfoBusItemRevokedEvent by calling InfoBus.fire Revoked( ).

Figure 10:
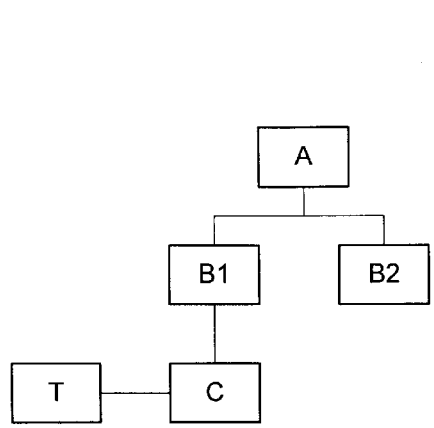
FIG. 10 is a flowchart illustrating the hierarchy for release in accordance with the present invention.

FIG. 10 is a block diagram illustrating the hierarchy or the release( ) rules. There's a data item called A that was provided to the consumer via a rendezvous. A implements a DataItem and a Collection interface. Collection A has two sub-items, Collection B1 and B2, which each implement DataItem. Collection B1 has one sub-item, an ImmediateAccess C, that implements Transferable but does not implement DataItem. Suppose the consumer has requested references to B1, B2, C, and a data transfer object T obtained from C.getTransferData( ).B1.release( ) should be called when all references to C and T have been dropped, and the consumer plans to drop B1 immediately after calling B1.release( ).

A.release( ) should be called when all references to B1, B2, C, and T have been dropped, and the consumer will drop A immediately after calling A.release( ). Calling A.release( ) implies that all sub-items are also released, so when all references to sub-items have been dropped, B.release( ) need not be called before calling A.release( ).

Above, it was presented that data items suitable for exchange on the InfoBus are those that might be useful to more than one consumer and might be available from more than one producer. Data may be represented by one of the standard access interfaces defined here. Although private access methods can be used with items exchanged on the InfoBus, it defeats the purpose of providing a standard means of exchange between arbitrary components.

The InfoBus access interfaces, when implemented on a data item, allow the consumer to access the producer's data in a standard, application independent fashion, without knowing the details of the internal representation of the data the way the producer sees it. A producer should implement as many standard access interfaces as possible, to support the greatest variety of consumers, and richer function of those consumers. In general, the access interfaces are not mutually exclusive; depending on the nature of the data, it might make sense to implement all of them.

Producers establish a policy of when, if ever, data can be changed by consumers. The policy may vary depending on the consumer's permissions. Most InfoBus access interfaces define methods for changing the data items. If a producer chooses not to support changes to a data item, whether for any consumer or on the basis of examining a particular consumer, it can throw an exception in place of making the change.

The producer may call AccessController.checkPermission( ) to determine permissions during the handling of a method that can change a data item. The producer decides how permissions will be used in this case.

It is preferred that producers accept an ImmediateAccess, if present in the argument to setValue-type methods, as the preferred source of a newValue, but also allow for producers to accept other types of Objects that make sense for the application. This applies to all access interfaces defined in this InfoBus Specification as well as the similar methods in interfaces defined for JDK Collections. ImmediateAccess provides the producer with methods needed to determine the new value. It can attempt to parse a string representation, or copy an Object if it is of a suitable type, or use the value from an Object.

The mutable data item must implement all methods that change data items, including collections, in a way that is thread-safe, for example by using a synchronized method or block. If the data item supports DataItemChangeEvents, it must distribute change events due to changes before exiting the synchronized code region. This means a consumer that is changing a data item can rely on seeing the event for the change it initiated before its call to change a data item returns.

A data item implements ImmediateAccess interface 350 of FIG. 8 to allow data values to be retrieved directly from calls to methods on this interface, returning an immediate rendering of the data as a String or Object. The interface is also convenient for wrapping final Objects, which cannot be passed with additional interfaces via a subclass, as in the example showing a data item housing a Double in FIG. 8.

ImmediateAccess is preferred for data items that are not collections, because they provide common renderings as a String or Object, independent of the type of data the item represents. This makes it easier for data consumers, who can simply use these strings for representing the object to the user, without knowing any more about the nature of the Object.

ImmediateAccess can also be used to supply a user-presentable string identifying the collection as a whole. This may be different from the advertised data item name, which is obtained by a method in the DataItem interface.

The public String getValueAsString( ) method returns an unformatted representation of the data item. For example, if the item represents a dollar value, the string may return just the digits. There is no requirement that the returned string be the same as getValueAsObject( ).getString( ).

The public String getPresentationString(java.util.Locale locale) method returns a formatted representation of the data item appropriate for the specified locale. For example, if the item represents a dollar value and the locale indicates the United States, the string may be formatted with a dollar sign, commas, and a decimal point. If locale is null, the consumer is asking for the producer's default locale. The method may throw UnsupportedOperationException to indicate that it does not support the specified locale.

The public Object getValueAsObject( ) method returns a reference to the Object that is "wrapped" in this ImmediateAccess. The type of the Object is implementation dependent. A consumer that accesses the Object directly may interrogate it to discover its type, or may examine the MIME type (if available) for this purpose. A producer may choose not to expose an Object by returning null.

The public Object setValue(Object newValue) throws InvalidDataException method sets a newValue for the immediate data in this object. It is recommended that all producers accept an ImmediateAccess, if present, as the preferred source of a newValue, but also allow producers to accept other types of Objects that make sense for the application. A producer should not change the type of Object housed in an ImmediateAccess, only its value.

The producer's implementation must obtain the new value from the argument object before returning, rather than saving a reference to it, because the caller may change its value after the return. In obtaining the newValue from the argument, the provider's implementation may need to make a deep (recursive) copy of newValue to get all values changed by the consumer, for example when newValue is a collection of subitems.

If the item supports change notifications, the producer should notify listeners after the value has changed, but before returning from setValue. Such change notifications look the same as if the producer had changed the value itself.

UnsupportedOperationException should be thrown when the underlying data source does not support changes from any consumer (e.g., read-only). java.security.AccessExceptions should be thrown when a given consumer does not have permission to change the data. Java.lang.IllegalArgumentException should be thrown if newValue is a type that is not recognized by the producer for representing the new value. InvalidDataException should be thrown if the new value is invalid for this field.

Data items that implement the ArrayAccess interface are collections of data items organized in an n-dimensional array. ArrayAccess objects are bounded in size; that is, their dimensions can be obtained at any time. Essential to the notion of an array is that you have random access (without significant performance penalty) to any element of the array. Almost all the other forms of data could be modeled as a (degenerate) form of an array, but often the notion of unpenalized access to any element does not hold true.

Those methods where invalid coordinates are specified can throw ArrayIndexOutOfBoundsException. The method public int[] getdimensions( ), which throws the ArrayIndexOutOfBoundsException when the coordinates are invalid. The number of integers in the returned array indicates the number of dimensions in the object implementing the ArrayAccess, and the value of each integer indicates the number of elements in the ArrayAccess in that dimension— e.g., a return value of {5,6,7} indicates a 5×6×7 three-dimensional ArrayAccess.

The public Object getItemByCoordinates(int[] coordinates) method retrieves an individual data item from an ArrayAccess by way of its index. Retrieval of a data item via getItemByCoordinates( ) should not affect the cursor for other access interfaces on the object that implements ArrayAccess. Indexing in each dimension is zero-based; that is, coordinates[i] range from 0 to (getDimensions( )[i]−1), to agree with Java arrays.

For mutable ArrayAccess objects, it is preferred that this method return an item that implements ImmediateAccess to allow the item to be changed; or to establish an initial value if the location had no previous value set.

The public void setItemByCoordinates(int[] coordinates, Object newValue) throws InvalidDataException method sets a new value for an item at the indicated coordinates in an ArrayAccess. Setting a data item via this method should not affect Iterators for other access interfaces on the object that implements ArrayAccess. Indexing in each dimension is zero-based; that is, coordinates[i] range from 0 to (getDimensions( )[i]−1), to agree with Java arrays. It is preferred that all producers accept an ImmediateAccess for setting the newvalue.

UnsupportedOperationException must be thrown when the underlying data source does not support changes from any consumer. The java.security.AccessExceptions must be thrown when a given consumer does not have permission to change the data. The java.lang.IllegalArgumentException must be thrown if newValue is a type that is not recognized by the producer for representing the new value. InvalidDataException must be thrown if the new value is invalid for this field.

The public ArrayAccess subdivide(int[] startCoordinates, int[] endCoordinates) method returns an ArrayAccess which is a subset of the ArrayAccess on which it was called, with coordinates in the new subset readjusted to start at zero. For example, a data set arranged as rows and columns can be divided into arrays representing individual columns or rows. The endCoordinates must be equal to or greater than the startCoordinates for all dimensions. The method throws an ArrayIndexOutOfBoundsException on an out-of-bounds access.

InfoBus does not define a specific access interface for implementing a tree. Trees should be implemented by using one of the JDK Collection interfaces recursively, e.g. creating a Collection that contains Collection objects, and so on.

When ArrayAccess and any of the JDK Collection access interfaces are implemented on the same data item, there may or may not be a relationship between the order of accessing elements using an Iterator or ListIterator and the indices of an ArrayAccess. When using the standard implementations of the collections, it may not be convenient to provide indexed access in an efficient manner.

When using the JDK Collection interfaces as a public contract for a private implementation along with ArrayAccess, it is preferred that the right-most integer in the dimensions array be the index that changes most frequently when an object is iterated. For example, an ArrayAccess that returns {5, 4, 3} as its dimension array is a 5×4×3 array, and successive calls to Iterator.next( ) would return the following elements from ArrayAccess:

0, 0, 0
0, 0, 1
0, 0, 2
0, 1, 0
etc.

The task of creating an InfoBus-compliant data item includes making a decision on which of the interfaces to implement. While the InfoBus API requires only that a data item be an Object, there are additional requirements for an InfoBus-compliant data item. Note that the 'top-level' item refers to the one handed out via the rendezvous mechanism, which may have sub-items. Data items that are members of a collection data item are referred to here as "sub-items."

- It is required that top-level data items implement DataItem. It is also recommended to implement DataItem for sub-items whenever possible.
- DataItemChangeManager is recommended for all data items where it makes sense, including sub-items of multi-level data items. When present, the manager is required to manage listeners and send notifications to them for all changes.
- An InfoBus-compliant data item is required to provide at least one of the standard access interfaces for top-level data items. It is preferred to use these interfaces for all sub-items.
- It is preferred that methods used to set a value in a mutable data item accept an ImmediateAccess, if present, as the source of the new value; other Objects can be accepted at the discretion of the producer.

Database Access Interfaces

In many cases including Relational Database Management Systems, data is organized into (or can be returned as) tables containing rows and columns. Each row has the same number of columns, and each column is homogenous—within a column, the data is of a particular datatype, or null. A table may have no rows. Typically, a server program that controls all access to the data manages the data.

To retrieve data from such a source, the client composes a query (typically in a dialect of SQL), submits it to the database server, and receives a result set of rows, or rowset, in return. It is then possible to determine the "shape" of the rowset (the number of columns returned and their names and datatypes). There may be no data rows in the rowset.

To send data to such a source, or modify the data, INSERT, UPDATE and DELETE operations are supported. These return a success indicator and the number of rows affected (this may be zero), but not a result set. Other operations are also usually supported, including such things as creating and deleting tables, granting and revoking access, and storage management. These operations return a success indicator but not a result set or number of rows affected.

While tables in a database and the rowsets returned from retrieval queries could be modeled as InfoBus ArrayAccess data items, this is not a natural match for the following reasons:

- The number of rows and columns is not known ahead of time and can be expensive to determine, so ArrayAccess.getDimensions( ) cannot always be supported;
- A very large number of rows may be returned
- The column names and datatypes may not be known ahead of time and it may be necessary to discover this at runtime.

RowsetAccess interfaces are provided to solve these problems. This family of interfaces can be used for constructing a data item in addition to or instead of other access interfaces defined in the previous chapter.

Figure 11:
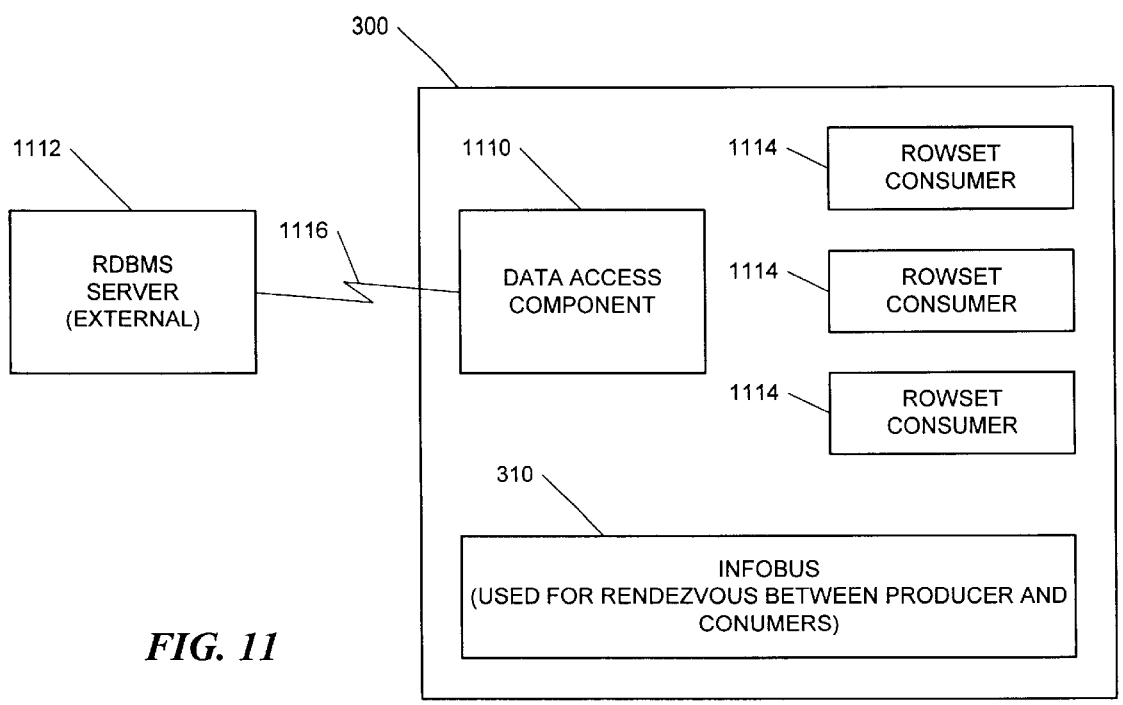
FIG. 11 illustrates conceptually a data access component operating as a producer in accordance with the present invention.

FIG. 11 illustrates the use of a DAC 1110 for serving data to local consumers 1114. When a remote server 1112 provides the data, a data access component (DAC) 1110 can be constructed as a producer that provides RowsetAccess data items. Remote server 1112 communicates with DAC 1110 via a network protocol 1116. DAC 1110 serves as a translator between the remote source 1112 and the local consumers 1114 of the data.

The RowsetAccess interfaces represent a different model from the access interfaces previously described above in that the contents of a RowsetAccess item change as the cursor is moved. This difference reflects the orientation of an external, potentially huge data store. The data is not "in" the data access applet or bean, but in another data store, usually on another machine. The interfaces described above are more oriented toward internal data, i.e. data which is "in" an applet or bean running in the local environment such that the total size is known and all the data is immediately available.

Also, the RowsetAccess interfaces extend the use of the DataItemChangeEvent in two ways. First, if there are any change listeners on a RowsetAccess item, a RowsetCursorMovedEvent is emitted when the row cursor changes. Second, data items are used to represent column values, and as the row cursor changes, these data items are modified by the data producer and change notifications sent to any listeners. While this is a standard InfoBus mechanism, in this case it is the data producer itself which is changing the values of the items representing columns.

Even with these differences, it might make sense to implement both RowsetAccess and ArrayAccess for some data items. For example, if a query results in a set of a hundred rows, the data access component (producer) may choose to make it available via both interfaces.

To process a retrieval query, a database server may do extensive work on behalf of the client, using available indexes wisely, constructing temporary tables when appropriate, obtaining and releasing physical locks on data and index pages, etc. The server typically maintains bookkeeping structures as it returns the result rows, and the current row is presented to the client via a "cursor." Servers free up resources as soon as possible in order to serve more clients more efficiently, so generally only one cursor is supported per result set. While some servers support backward scrolling cursors, only forward scrolling cursors are guaranteed.

In support of the database notion of a cursor, RowsetAccess implements a slightly different model for data items compared to those described in the Data Items section above. Whereas it looks like a collection of records (rows), when the consumer obtains a row of information, the row actually contains the information for the record at the current cursor position. When the cursor changes, the contents of a row also change. A change notification is available that tells the holder of a row item when its contents changed because of cursor movement. Also, when consumer changes the cursor, holders of an item of the current row all see their contents change. Finally, it is not possible to watch for value changes on an arbitrary row, only on the current row.

Data items that implement the RowsetAccess interface are collections of rows obtained from a data source, usually a relational database server. The RowsetAccess interface contains methods to discover the number and type of columns, to get the next row, to obtain column values, and to insert, update and delete rows.

Initially the rowset is positioned before the first row, and it is necessary to call nextRow( ) to obtain each row.

Metadata methods are provided to return information about the rowset rather than the data itself. The public int getColumnCount( ) method returns the number of columns in the rowset.

The public String getColumnName(int columnIndex) throws IndexOutOfBoundsException method begins numbering the columns starting from one. Given the one-based columnIndex, the method then returns the name of the column if available, else null. For example, calculated columns may have no name.

The public int getColumnDatatypeNumber(int columnIndex) throws IndexOutOfBoundsException method also begins numbering the columns from one. Given the one-based columnIndex, the method then returns the column's SQL type using the encoding in java.sql.Types. For producer specific datatypes, this should be java.sql.Types.OTHER.

The public String getColumnDatatypeName(int columnIndex)throws IndexOutOfBoundsException is a method that, given the one-based columnIndex, returns the column's data source specific type name. For producer specific datatypes, this should be the package and subpackage qualified name of the Java class used to represent the datatype, such as "com.yourorg.data.SpecialDataType".

The cursor movement method, public boolean next( ) throws SQLException, RowsetValidationException, advances the row cursor to the next row. Returns true if there is a next row, false otherwise. It is valid for a rowset to contain zero rows, so the first call to nextRow( ) may return false. If modification of the data is supported, moving the cursor may submit a pending change to the database.

When a rowset's cursor is moved, if the rowset has any DataItemChangeListeners, the data producer calls the listener's rowsetCursorMoved( ) method with a DataItemChangeEvent object. Further, only one data consumer should call nextRow( ); if two or more consumers each get the same data item implementing RowsetAccess and both use nextRow( ), each can miss some of the data.

The public int getHighWaterMark( ) method returns the total number of rows known to the data producer. The data producer should not throw an exception for this method. In the simplest case, the data producer merely counts the rows as it fetches them. In more sophisticated cases, the data producer may be able to obtain information from a middle tier which fetches rows in chunks.

The public boolean hasMoreRows( ) method returns a conservative indication of whether more rows exist in the set. Specifically, a returned value of false indicates that the last row has been accessed. A returned value of true indicates that further rows may exist.

Simple data providers may return true when actually on the last row and then return false after detecting they have fetched the last row. Data providers for sophisticated back-ends may be 100% accurate. Sophisticated consumers can avoid an extraneous attempt to retrieve non-existent rows in the case that false has been returned.

InfoBus database access components use the standard mapping between JDBC types and Java types. For a data item obtained as a column value, when obtained as an Object (for example, by calling ImmediateAccess.getValueAsObject( )), the Object must have the same actual type as the Java type corresponding to the column's JDBC SQL type.

The public Object getColumnItem(int columnIndex) throws IndexOutOfBoundsException, SQLException method, when given the one-based columnIndex, returns a data item which can be used to obtain the current value of the specified column. This is usually an ImmediateAccess item. The value changes as nextRow( ) is called, that is the data item tracks the current row, and if the column item implements DataItemChangeManager, DataItemChangeEvents are generated. This method throws IndexOutOfBoundsException if the column index is invalid.

The public Object getColumnItem(String columnName) throws ColumnNotFoundException, DuplicateColumnException, SQLException method, when given the columnName, returns a data item which can be used to obtain the current value of the column. This is usually an ImmediateAccess item.

As for getColumnItem(int columnIndex) above, the value changes as nextRow( ) is called; that is, the data item tracks the current row, and if the column item implements DataItemChangeManager, DataItemChangeEvents are generated. The method is useful instead of the column number version above when many columns are returned and the order of the columns changes over time, but the names of the columns do not change. The method throws an exception if the specified column is not present in the RowsetAccess object, or if more than one column with a matching name is found.

Both flavors of getColumnItem( ) are designed to return a data item which tracks the value of the specified column in the current row. By definition, this succeeds if the column name or number is valid, but throws an exception as described above if the column number or name is invalid.

Since the data item returned is (usually) an ImmediateAccess item, the data consumer must still call getValueAsObject( ), getValueAsString( ), or getPresentationString( ) to obtain the value. If no row is available, getValueAsObject( ), getValueAsString( ), and getPresentationString( ) should throw an exception.

If the data item returned is not an ImmediateAccess item, the data consumer must still invoke other methods to obtain values in the column. In relational databases, a column value is normally a scalar, but in principle RowsetAccess could be used to return non-scalar column data from other types of data sources.

Thus one need only obtain a data item for each desired column once. This is more efficient even for the simple use pattern.

Data modification methods are provided to insert, update, and delete rows. If the data item does not support a particular operation, the owner can throw UnsupportedOperationException (a runtime exception and thus not listed explicitly in the throws clause of these methods.) The owner may also throw java.security.AccessControlException if the caller does not have permission to change the data, or InvalidDataException if the new data is not valid. Column values may also be modified via ImmediateAccess.setValue( ) if a data item has been obtained for the column.

After a row is changed, cursor movement may cause the row to be submitted to the underlying data store, and this may cause an exception. However, not all data providers submit changes on cursor change. The flush( ) method may be used to explicitly submit a changed row to the database.

The public void newRow( ) throws SQLException, RowsetValidationException method creates a new, empty row and sets the row cursor to this row. Since this changes the row cursor, this may propagate a changed row to the back end, and this may throw an exception.

The public void setColumnValue(int columnIndex, Object object) throws SQLException, RowsetValidationException, IndexOutOfBoundsException method sets the value of the specified columnIndex in the current row to the supplied value. columnIndex is the one-based column number. This is used both to update existing rows and to supply values for new rows. It is preferred that all producers accept an ImmediateAccess, if present, as the preferred source of a newValue, but also allow for producers to accept other types of Objects that make sense for the application.

The public void setColumnValue(String columnName, Object object)throwsSQLException, RowsetValidationException, ColumnNameNotFoundExcepti on, DuplicateColumnException method sets the value of the specified column in the current row to the supplied value. columnName must identify exactly one column. It is preferred that all producers accept an ImmediateAccess, as the preferred source of a newValue.

The public void deleteRow( ) throws SQLException, RowsetValidationException method deletes the current row.

The public void flush( ) throws SQLException, RowsetValidationException method explicitly submits changes in the rowset to the underlying data store.

The public void lockRow( ) throws SQLException, RowsetValidationException method requests a row level lock on the current row, if supported by the backend and the data producer. The method does nothing if it is not supported.

Normally each row change is an implicit transaction, and the lock is released by moving to a different row. If an explicit transaction has been started by way of a call to DbAccess.beginTransaction( ), the locked is released during the processing of DbAccess.commitTransaction( ) or DbAccess.rollbackTransaction( ).

The next discussion is on determining the mutability of the data source. Data repositories support different combinations of retrieval, insert, update and delete. Some are read only, some allow all operations, and some allow other combinations such as read and insert, but not delete or update.

The following methods allow the data consumer to determine which operations may be attempted. A particular operation may fail due to other reasons such as access control, integrity constraints, or network connection problems.

The public boolean canInsert( ) method returns true if inserting new rows is allowed and false if otherwise.

The public boolean canUpdate( ) method returns true if modifying the items in all columns in the existing rows is allowed and false if otherwise.

The public boolean canUpdate(String columnName) throws ColumnNotFoundException, DuplicateColumnException and public boolean canUpdate(int columnNumber) throws indexOutOfBoundsException methods return true if modifying the items in the specified column is allowed and false if otherwise.

The public boolean canDelete( ) method returns true if deleting rows is allowed, false otherwise.

The public DbAccess getDb( ) method returns a DbAccess item representing the database associated with the Rowset. This returns null if the DataProducer does not support the DbAccess interface. For more information, see the DbAccess interface below.

A ScrollableRowsetAccess interface is provided and this interface extends RowsetAccess, and represents the case in which the data provider can support moving the row cursor backwards and creating multiple cursors.

The public ScrollableRowsetAccess newCursor( ) method returns a new ScrollableRowsetAccess having the same underlying data but an independent cursor. The new cursor is positioned before the first row. The object returned is a separate data item from the one on which newCursor( ) was called. The new data item has no name (i.e., if it implements DataItem, getProperty("Name") should return null).

The public void setBufferSize(int size) method asks the data provider to keep the specified number of rows immediately available. The specified size is a hint for performance and does not throw an exception if not supported.

The public int getBufferSize( ) method gets the buffer size in effect. If setBufferSize is not supported, this will be 1.

Additional cursor movement methods are provided to the ScrollableRowsetAccess interface. In addition to the methods listed here, the next( ) method defined for RowsetAccess is also available.

The public boolean previous( ) throws SQLException, RowsetValidationException method moves the row cursor to the previous row. Returns true if there is a previous row, otherwise false.

The public boolean first( ) throws SQLException, RowsetValidationException method moves the row cursor to the first row. Returns true if there is a first row, false if the rowset is empty.

The public boolean last( ) throws SQLException, RowsetValidationException method moves the row cursor to the last row. Returns true if there is a last row, false if the rowset is empty.

The public boolean relative(int numRows) throws SQLException, RowsetValidationException method moves the row cursor forward the specified number of rows (or back if numRows is negative.) Returns true if the specified row exists, false otherwise. This can position the cursor before the first row or after the last row.

The public int getRow( ) method gets the row number of the current row. The public int getRowCount( ) method returns the total number of rows in the rowset. Some data producers will not support this operation without fetching all the rows, and should throw UnsupportedOperationException.

The public boolean absolute(int rowIndex) throws SQLException, RowsetValidationException method moves the row cursor to the specified rowIndex. Returns true if the specified row exists, false otherwise.

The next interface is called a DbAccess interface. In some cases, the data consumer will wish to control the lifetime of a data item representing a rowset. This can be important if the retrieval query ties up significant resources on the database server, or large numbers of rows are involved, or both. In this scenario, only the consumer knows how long the data item is needed. For example, if a query returns a large number of rows, e.g. one million, if there is only one consumer, and if the consumer is only interested in the first few rows, e.g. one screen view, the data item and the resources on the database server should be released as soon as the consumer reads the first screenful of rows.

Also, in some cases it is more convenient for the data consumer to construct the query and control when it is executed and whether the result is made available to other InfoBus aware components.

Connect and Disconnect methods intentionally mirror their counterparts in java.sql.DriverManager and java.sql.Driver. They are intended for cases in which components other than the data producer need to control the time of connection and disconnection, since a connection to a database can be an expensive resource.

A producer can implement the DataItem interface on RowsetAccess items and DbAccess items to provide the release( ) method. By supporting release( ), the producers may choose, if appropriate, to implicitly disconnect when the last dependency on resources goes away.

The public void connect( ) throws SQLException method attempts to establish a connection to the given database URL. Any required connection arguments such as user ID and password must be defined in the producer. For example, these might be supplied to the producer outside the DbAccess interface via HTML <PARAM>s, JavaBean properties, or incoming InfoBus data items.

The public void connect(String url, String username, String password) throws SQLException method attempts to establish a connection to the given database url using the supplied username and password.

The public void connect(String url, Properties info) throws SQLException method attempts to establish a connection to the given database url using the connection arguments in info. Typically, "user" and "password" properties are required.

The public void disconnects throws SQLException method unconditionally disconnects from the current database. The producer should announce that all data items have been revoked prior to disconnecting, by firing an InfoBusItemRevokedEvent via the InfoBus and by firing a DataItemRevokedEvent on each DataItemChangeManager. Further use of the DbAccess object, except to connect, is undefined. Further use of RowsetAccess/ScrollableRowsetAccess objects associated with the DbAccess object is undefined.

The public java.sql.DriverPropertyInfo[] getPropertyInfo (String url, Properties info) method allows a data consumer to discover what connection arguments the data producer requires to connect to a database. The database is specified by url, and a proposed list of connection arguments is specified by info (this may initially be empty.)

The resulting array of DriverPropertyInfo objects may be empty if no connection properties are required. Otherwise, it is a list of properties, some of which may be required. See java.sql.Driver.getPropertyInfo. In complex cases it may be necessary to call getPropertyInfo( ) multiple times—the possible or required connection arguments may depend on previous choices.

The public Object executeRetrieval(String retrieval, String dataItemName, String options) throws SQLException method executes the specified retrieval query and returns the result as an Object. retrieval specifies the retrieval query, which is typically a SQL SELECT or a stored procedure which returns a result. If dataItemName is not null, the data provider should make the resulting RowsetAccess item available under the specified dataItemName. Options provides special instructions to the data provider. This may be null, or a space delimited list of option strings. The producer is not required to honor these requests, but if it does it should use the specified syntax. The producer is not required to honor these requests. When using the functions listed here, the producer should use the strings indicated for those functions. A producer can add other functions as needed. The following option strings are predefined:

| Option string | meaning |
|---|---|
| "ArrayAccess" | asks the producer to return an object which implements the ArrayAccess interface. |
| "Map" | asks the producer to return an object which implements the Map interface |
| "RowsetAccess" | asks the producer to return an object which implements the RowsetAccess interface. |
| "ScrollableRowsetAccess" | asks the producer to return an object which implements the ScrollableRowsetAccess interface. |

-continued

| Option string | meaning |
|---|---|
| "PreFetch=n" | asks the producer to pre-fetch the specified number of rows, where n represents the number. 0 means none, −1 means all. |
| "RowLimit=n" | asks the producer to fetch no more than the specified number of rows, where n represents the number. 0 means none (for cases where only the resulting column names and datatypes are desired.), −1 means all. |

The method returns an item implementing RowsetAccess if the operation succeeded. If the operation fails, an SQLException is thrown.

The public int executeCommand(String command, String dataItemName) throws SQLException method executes the specified non-retrieval query and returns the count of rows affected, or −1 if this is not applicable. command specifies a non-retrieval query, such as SQL INSERT, UPDATE, DELETE, or a stored procedure which does not return a result. If dataItemName is not null, it instructs the data provider to make the count of affected rows available as an ImmediateAccess data item. The method returns the number of rows affected. This can be 0 for INSERT, UPDATE, DELETE or equivalent, or −1 if this is not applicable (for commands which do not manipulate rows). If the operation failed, a SQLException is thrown (see java.sql.SQLException).

Transaction methods are now listed. By default, changes are implicitly committed when sent to the underlying data store.

Many database servers and intelligent middle tiers support grouping of modifications into transactions such that the group of changes is atomic (either all of them take effect or none of them take effect.) Such transactions are at the database level, since changes to multiple tables are allowed. Because the capabilities of databases vary, some of these methods are optional and may have no effect, as noted.

The public void beginTransaction( ) method does not commit changes when they are sent to the underlying data store. Begin explicit commit mode. The producer should throw UnsupportedOperationException if it does not support this method.

The public void commitTransaction( ) throws SQLException, RowsetValidationException method performs any database integrity and consistency checks on changes sent to the database since the last beginTransaction. If all checks pass, make the changes permanent in the database. Multiple tables may have been modified using multiple rowsets; all such changes are applied. Following the commit, resume implicit commit mode.

The public void rollbackTransaction( ) throws SQLException, RowsetValidationException method undoes all changes sent to the database since beginTransaction. This may affect multiple rowsets. Resume implicit commit mode.

The public void validate( ) throws SQLException, RowsetValidationException method, if supported, performs explicit validation of all changes to the database since the last begin Transaction( ), without committing them. Multiple tables may have been modified using multiple rowsets; all such changes are validated. Does nothing (and does not throw an exception) if not supported by the data producer.

The public void flush( ) throws SQLException, RowsetValidationException method, If supported, sends all changes made through any rowset to the database. Column, row, cross row, and some cross table integrity and consistency checks may be applied, and it does nothing if not supported by the data producer.

Producers may implement the RowsetValidate interface to provide a means of validating the contents of a Rowset data item. This interface is optional: producers can implement it or not as they choose; consumers may use it or not if it is present.

The public void validateCurrentRow( ) throws RowsetValidationException method explicitly validates data in the current row only.

Typically, the producer performs checks that can be done locally without involving underlying data store. For example, this method could check that the value in a column is one of the allowed values or is in a range of values.

The public void validateRowset( ) throws RowsetValidationException method validates data in the current rowset, taken as a set of rows.

Typically, the producer performs checks that can be done locally without involving underlying data store. The checks may involve more than one row. For example, this method could check that the sum of one particular column in the current set of rows does not exceed a particular value.

Database items may also be released using DataItem.release( ). When this method is called for database items, the producer must have a policy about how it will behave for items that have been modified but require commitTransaction to be called to apply the changes to the database.

The producer should treat release( ) as having an implied rollbackTransaction method call, so that changes are not applied except when explicitly committed by a consumer. If the producer decides to adopt a policy to commit instead, it must be clearly documented so that application designers can plan for this.

Monitoring Changes to Data Items

After a consumer acquires a data item from a producer, it can begin to access the data by way of the various access interfaces discussed in the previous two chapters. A consumer may need to monitor changes to the data item, for example to cue it for updating its display. Change notifications are sent by the producer to registered consumers using an event-based scheme. This scheme is similar to but logically separate from the InfoBus events used for rendezvous about data items in order to reduce traffic on the InfoBus.

Four classes and interfaces are defined for the InfoBus mechanism for monitoring data item changes:

DataItemChangeManager—implemented by the producer on data items for which it is able to notify consumers of changes.

DataItemChangeSupport—an implementation of DataItemChangeManager that defines methods to manage listeners and fire events that can be used in applications.

DataItemChangeListener—implemented by a consumer then registered with the producer to receive notifications of changes.

DataItemChangeEvent—a base class for change events which are sent by the producer to registered consumers via their DataItemChangeListener objects.

Figure 12:
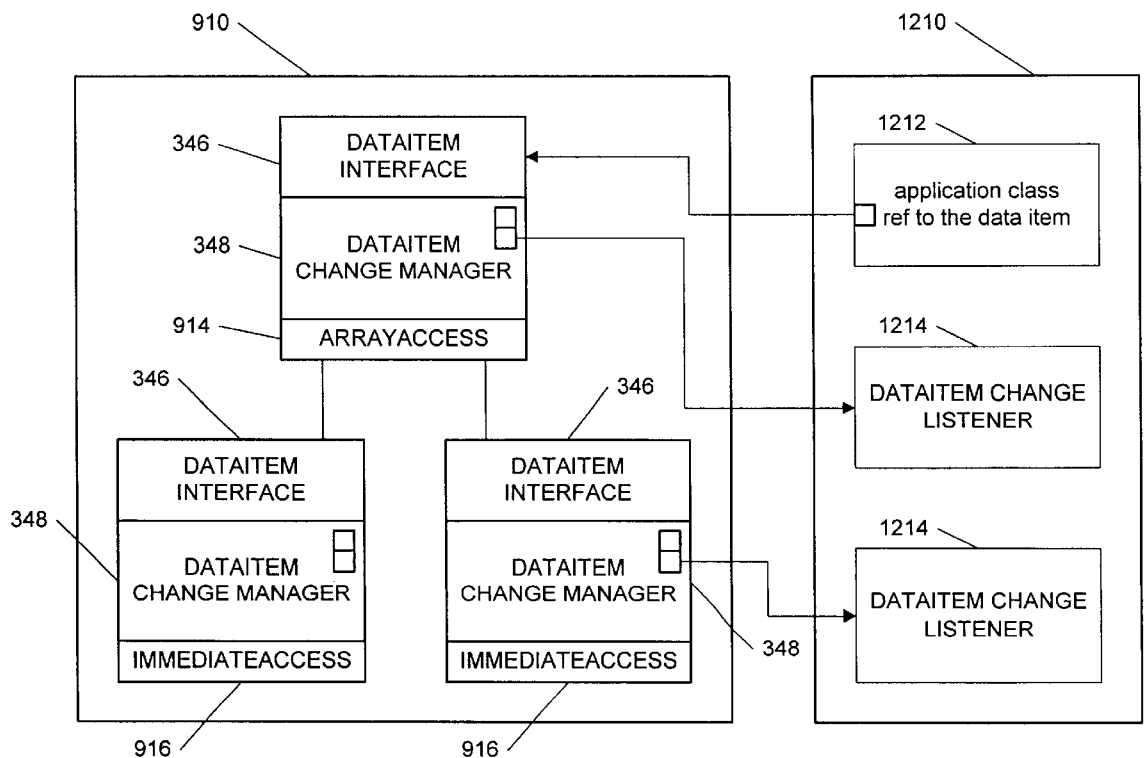
FIG. 12 illustrates conceptually how changes in data are updated and managed in accordance with the present invention.

FIG. 9 depicted spreadsheet data producer 910 that provided data items for a sheet collection of two cells, along with the relationship between the exposed data items and the internal data representation. FIG. 12 illustrates the same spreadsheet data producer 910, but shows the relationship between the producer's data items found in DataItem interfaces 346 and the change listeners 1214 registered by a consumer application 1212 within a data consumer 1210. Consumer 1210 is interested in changes occurring to the sheet as a whole, perhaps so it knows when to repaint a graph, as well as changes to one cell in particular, which may be displayed separately.

In a slightly more complex example, different consumers 1210 may register change listeners 1214 at various parts of a data item hierarchy. To producer 910 it looks no different; it does not distinguish which change listeners 1214 are provided by which consumers 1210. Change events are "multi-cast" to those listeners that have attached themselves to the data item in no defined order.

Data producers should be tolerant of exceptions in listeners, and in general should ignore any exceptions thrown by a listener. In particular, an exception thrown by one listener should not prevent other listeners from receiving the event.

A DataItemChangeManager interface 348 is provide to allow a data item to provide notifications to a consumer 1210 when the item has changed, by managing DataItemChangeListeners registered by the consumer 1210 for this purpose. It is preferred that data items provide change listener support at all levels of a collection hierarchy where it is possible, to offer maximum flexibility to data consumers. This allows producer 910 to choose the granularity of notifications it wants. In the example above, consumer 1210 can look for changes on any individual cell, or on any in the spreadsheet as a whole.

Data items that implement DataItemChangeManager must support registration and deregistration of event listeners. Specifically, changes to the listener list may take place during notification of all listeners. Accordingly, the listener list should be copied at the beginning of a change notification, and the copy of the list used for the duration of the notification.

When data changes (whether by the producer for its own reasons, or on behalf of a change from any consumer, or in the producer's data source), the producer notifies registered listeners.

The public void addDataItemChangeListener (DataItemChangeListener listener) and public void removeDataItemChangeListener (DataItemChangeListener listener) methods form the standard JavaBeans design pattern for an object that emits a DataItemChangeEvent. A data consumer interested in continuing updates on a data item will call addDataItemChangeListener( ) to express that interest, and removeDataItemChangeListener( ) when it no longer needs the notifications.

A DataItemChangeSupport class is provided to implement DataItemChangeManager and can be used by a producer for any data item. This provides an instance of this class as a member field of a desired data item and delegates various work to it.

The public DataItemChangeSupport(Object source) method is a constructor that requires references to the data item object that implements the DataItemChangeManager interface. When an instance of this class is a member field for a data item, the source is a reference to the outer class that contains the instance of this class.

The public void addDataItemChangeListener (DataItemChangeListener listener) and public void removeDataItemChangeListener (DataItemChangeListener listener) methods form listener management methods that add and remove change listeners as requested by a consumer or other InfoBus component.

The public void removeAllListeners( ) method allows the producer to remove all listeners that may still be associated with the change manager can use this method. It should be called only after announcing that the item is being revoked both by way of InfoBus.fireItemRevoked and DataItemChangeSupport.fireItemRevoked.

Each method below creates an appropriate change event and sends it to all the listeners at that level only.

The public void fireItemValueChanged(Object changedItem, InfoBusPropertyMap propertyMap) method is generally called when an item, usually an ImmediateAccess, changes value. The caller indicates the changedItem as the one whose value changed.

The public void fireItemAdded(Object changedItem, Object changedCollection, InfoBusPropertyMap propertyMap) method may be called when one or more new items are being added to a collection. The caller indicates the changedItem as the one being added, and changedCollection as the collection that gained an item. ChangedItem can be null when more than one item is added in the same operation.

The public void fireItemDeleted(Object changed/Item, Object changedCollection, InfoBusPropertyMap propertyMap) method is generally called when one or more items are being removed from a collection. The caller indicates the changedItem as the one being removed, and changedCollection as the collection that lost an item. Changed/tem can be null when more than one item is removed in the same operation.

The public void fireItemRevoked(Object changedItem, InfoBusPropertyMap propertyMap) method is generally called when an item or collection is no longer available, such as when the data source is going offline. The caller indicates the changedItem as the item or collection that is being revoked. Unlike the other events, this event is sent to the data item passed during rendezvous, and to all sub-items in a collection hierarchy.

The public void fireRowsetCursorMoved(Object changedItem, InfoBusPropertyMap propertyMap) method is generally called when a rowset's cursor has moved to a different row. The caller indicates the rowset whose cursor changed.

After a successful rendezvous and receiving an initial data item, a consumer can receive notifications that a data item has changed by creating an instance of an object that implements DataItemChangeListener and registering it with the data item by calling addDataItemChangeListener( ). Listeners can be added to any data item that implements the DataItemChangeManager to support change notifications. A consumer can use the same listener object for data items, or different ones, according to its own needs.

The public void dataItemValueChanged (DataItemValueChangedEvent event) method indicates a changed value in the data item. A reference to the data item that changed can be obtained from the event.

The public void dataItemAdded(DataItemAddedEvent event) method indicates that a new item was added to an aggregate data item (ArrayAccess, a JDK Collection, etc). A reference to the data item that was added, and a reference to the one that gained it, can be obtained from the event.

The public void dataItemDeleted(DataItemDeletedEvent event) method indicates that an item was deleted from an aggregate data item (ArrayAccess, a JDK Collection, etc). A reference to the data item that was deleted, and a reference to the one that lost it, can be obtained from the event.

The public void dataItemRevoked (DataItemRevokedEvent event) method indicates that an item (and its sub-items, if any) has been revoked, and is temporarily unavailable. A reference to the data item that was revoked can be obtained from the event. The public void rowsetCursorMoved(RowsetCursorMovedEvent event) method indicates that the cursor for a RowsetAccess item has changed. A reference to the rowset data item can be obtained from the event.

DataItemChangeEvent is the base class of all other events described in this chapter. A data item fires a DataItemChangeEvent to all registered DataItemChangeListeners to inidicate that a change has occurred. The nature of the change is indicated by the name of each subclass. One way to fire change events is use DataItemChangeSupport, which has a fire method for each type of event.

The listener handles change events by implementing DataItemChangeListener.dataItemChange( ). It uses the instanceof operator to distinguish the various change events, and handles or ignores them as required.

The event includes a reference to the data item whose data changed and a reference to the item that manages the listener to which the notification is sent. The source of the change can only be set in the constructor so a separate event instance must be created for each change manager implementation in a multi-level collection hierarchy. This is intentional, for security reasons.

The DataItemChangeEvent(Object source, Object changedItem, java.util.Map propertyMap) class constructs a DataItemChangeEvent, indicating the item that manages a listener (source), the data item that changed, and an Map object that can be used for looking up the values for properties in getProperty( ). PropertyMap is optional, and null can be used when properties are not supported. The DataItemChangeEvent constructor is package access so that only the events defined by the InfoBus protocol can be sent.

The public Object getSource( ) method returns a reference to the source data item to which the change event listener is registered. This method is defined in java.awt.Event, rather than DataItemChangeEvent, which extends it. When a DataItemChangeSupport class is used to fire events, the source is the same as the reference passed to its constructor.

The public Object getChangedItem( ) method returns a reference to the data item that changed.

For collection size change and item value change events, this can be the same as the reference returned by getSource( ), meaning the item that changed is also the one that had the registered change listener. When it is not null and is different from getSource( ), it refers to a sub-item of the one that had the change listener. Finally, it can be null, meaning that more than one sub-item has changed in the same operation (for example, delete row).

For the revoked change event, getChangedItem( ) returns a reference to the top-level rendezvous item that is being revoked. The recipient of a revoked change event might not recognize the top-level item under some circumstances—for example, if a lower-level item was published in two overlapping collections. In these cases, the recipient is still obliged to treat the data item identified by getSource( ) as a revoked item.

For a rowset cursor moved event, getChangedItem( ) returns a reference to the RowsetAccess data item whose cursor was moved.

The public Object getProperty(String propertyName) method returns a property or metadata information about the change event. For example, properties can provide information about the nature of sub-items that changed when getChangedItem( ) returns null (which indicates that more than one sub-item changed).

Support for properties is optional; if the DataItemChangeEvent constructor received null as the map reference, getProperty( ) returns null. If a reference to an implementation of InfoBusPropertyMap was supplied in the change event constructor, this method calls InfoBusPropertyMap.get( ) with the specified key and returns the result. Null is the conventional return value when the specified key is not supported as a property name.

DataItemValueChangedEvent, DataItemRevokedEvent and RowsetCursorMovedEvent classes are two events that extend DataItemChangeEvent, overriding the constructor with a public constructor, but add no other methods or data. They also have a public constructor so they can be created using any implementation of DataItemChangeManager. Except for having a public constructor, the API is the same as for DataItemChangeEvent.

DataItemAddedEvent and DataItemDeletedEvent classes are classes that extend DataItemChangeEvent to modify the constructor and add a method that indicates the collection associated with the added or removed item, as well as a public constructor method.

In addition to the methods described below, the getSource( ) and getChangedItem( ) methods from DataItemChangeEvent are also available in these events.

The public DataItemAddedEvent(Object source, Object changedItem, Object changedCollection, java.util.Map propertyMap) and public DataItemDeletedEvent(Object source, Object changedItem, Object changedCollection, java.util.Map propertyMap) are a pair of methods that construct an event, indicating the source as the data item that sent the event, the item that was added or removed, the collection that changed, and an Map object that can be used for looking up the values for properties in getProperty( ). propertyMap is optional, and null can be used when getProperty( ) is not supported.

The public Object getChangedCollection( ) method returns a reference to the collection data item that lost or gained sub-items. For DataItemDeletedEvent, can return null when the item deleted was a singleton item (i.e., not a member of a collection).

Now described are the event classes defined for InfoBus data item change events, when they should be fired, and how consumers should respond to them.

The event classes are subclasses of DataItemChangeEvent. An event specifies a source data item, which is the item containing the DataItemChangeManager, and the data item that changed. If the reference to the item that changed is null, it means that more than one item was changed in the operation, for example by deleting a column of cells or filling a range of cells. Most events are empty subclasses of DataItemChangeEvent. DataItemAddedEvent and DataItemDeletedEvent modify the parent class to offer a reference to the collection that gained or lost items.

Most data items offered at the rendezvous are collections of other data items. A complex data item can have several levels to the collection hierarchy. When data items change, change events are distributed up or down the collection hierarchy, depending on the type of change that occurred, as listed below. When a change occurs, the producer must fire an event to all registered change listeners according to the rules described in this section, in any order that is convenient to the producer. When the rules indicate that a change notification should be sent to a given data item's listener, it means that the event should be sent if the DataItemChangeManager is implemented and has registered listeners.

The producer indicates the levels of the hierarchy for which it is willing to provide change notification service by implementing the DataItemChangeManager interface at these levels. Although implementations of DataItemChangeManager are not required, for maximum flexibility for consumer applications, we recommend an implementation of the interface at all levels where it makes sense. DataItemChangeSupport implements DataItemChangeManager, and provides methods to fire each type of change event when listeners are present.

Consumers can register a change listener at any level where a DataItemChangeManager is present. Listeners determine the nature of a data item change on the basis of the class type of the event they receive. The listener can use instanceof or attempt a cast for this purpose. Events can be handled or ignored according to the needs of the consumer, except for DataItemDeletedEvent and DataItemRevokedEvent, which require the consumer to release references and cease making calls to the data item that changed.

"Rendezvous item" is referred to at this stage as the data item provided to a consumer that requests the event, which is often a collection of other data items. Data items that are members of a collection data item are referred to as "sub-items." "Parent items" refer to any container item in the hierarchy (ArrayAccess, RowsetAccess, or one of the JDK Collections interfaces) which is the parent of a given sub-item.

An item is said to change value when calling a method to get its value returns a different result than before it changed. This can result when the underlying data itself has changed, such as when a method is called to change the value. Some items are treated as having a current value, for example the current time in the TimeSource.java example, or the current row of a RowsetAccess item. The value is said to change when the time changes or the rowset cursor moves to a record that has a different value for a given column.

When an item changes value, a change notification event should be sent for that item, then for its parent collection, and so on up to and including the rendezvous item. An item can belong to more than one collection, and the collections could have a common ancestor; in this case care must be taken to avoid a redundant item value change notification to the common ancestor. Items that can change value are those that have an immediate value, and are generally not collections. getChangedItem( ) returns a reference to the item that changed, or null to indicate more than one item changed in the same operation.

When one or more items are added to a collection item, DataItemAddedEvent should be sent for each added item and for the parents of the items up to and including the rendezvous point. getChangedItem( ) returns a reference to the item that was added, or null to indicate more than one item was added in the same operation. getChangedCollection( ) returns a reference to the collection that gained item(s).

When one or more items are permanently deleted from a collection, an event should be sent for each item and for the parents of the items up to and including the rendezvous point. When a container data item is being deleted, sub-items should fire DataItemDeletedEvent with the same rules. This event can also be fired with a singleton data item (i.e., one that is not a sub-item of a container item) is being deleted. getChangedItem( ) returns a reference to the item, or null to indicate more than one items were added in the same operation. getChangedCollection( ) returns a reference to the collection that lost the item(s) or null if it was a singleton item.

The consumer must cease making calls on this item, release any reference to it, and call DataItem.release( ) on the item.

A DataItemRevokedEvent method is sent when an item is being revoked by its producer, i.e. it is no longer available from the producer, for example because the producer's data source is going away. The event should be sent to all listeners for the item and, if it is a container item, to all listeners of any sub-items in the containment hierarchy. This event can also be fired with a singleton data item (i.e., one that is not a sub-item of a container item) is being revoked. This event differs from DataItemDeletedEvent in that it the item may be available in the future.

The consumer must cease making calls on this item, release any reference to it, and call DataItem.release( ) on the item.

A RowsetCursorMovedEvent method indicates that the cursor for a RowsetAccess data item has moved to a different row. The event should be sent to listeners of the RowsetAccess whose cursor changed.

Figure 13:
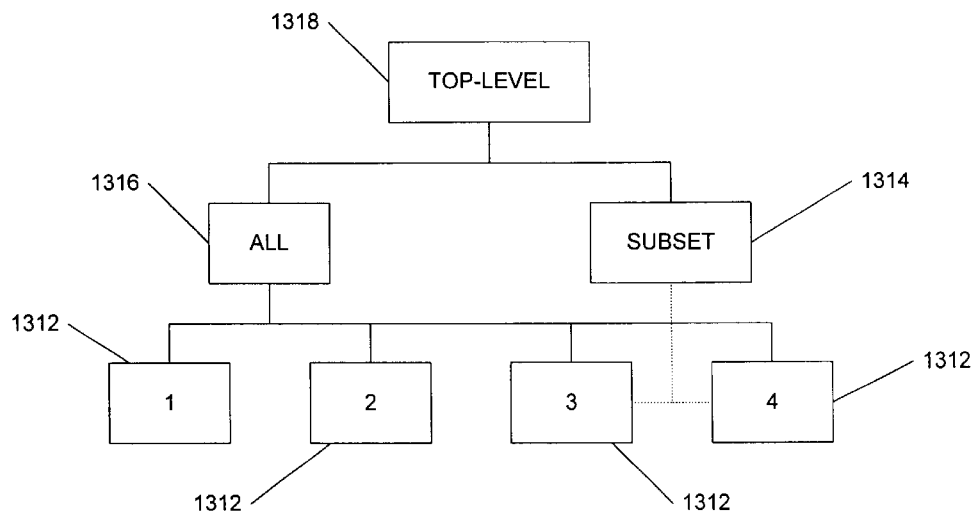
FIG. 13 illustrates a data item hierarchy of an item in more than one collection.

Consider FIG. 13, which is an example of a multi-level data item 1310 shown with a few sub-items 1312. The 'Subset' 1314 contains some of the same items as 'All' items 1316 where 'Top-level' 1318 is the rendezvous point. This depicts a data item hierarchy example with an item in more than one collection in the hierarchy.

The following list looks at various changes that are possible in this hierarchy and the way events should be distributed to notify listeners. Having notification occurring at a given level means that it should occur of the item at that level implements DataItemChangeManager and has at least one listener, and that all listeners at that level receive the event. Whenever an event is sent to a listener of some data item, the source is a reference to the data item that manages the listener list (is a DataItemChangeManager).

- If item '3' changes value, fire a DataItemValueChangedEvent specifying '3' as the item that changed on listeners of '3', 'Subset', 'All', and 'Top-level'. The listeners of 'Top-level' should be notified exactly once.
- If item '3' is deleted, fire a DataItemDeletedEvent specifying '3' as the item that changed and 'Subset' as the collection that changed on listeners of '3', 'Subset', and 'Top-level'. Next, fire the event specifying '3' as the item that changed and 'All' as the collection that changed on listeners of '3', 'All', and 'Top-level'. If instead '3' is removed from 'Subset,' but still remains in 'All', only the first set of notifications are sent, because 'All' didn't change.
- If items '3' and '4' are being deleted in one operation, fire a DataItemDeletedEvent specifying each item as the item that changed on the listeners of each item, then fire the event specifying null as the item that changed on listeners of 'All', 'Subset', and 'Top-level'. Instead of sending null, notifications could be sent for each of items '3' and '4' to the parent collections.
- If item '2' is added to the 'Subset' collection, fire DataItemAddedEvent specifying '2' as the item that changed and 'Subset' as the collection that changed on listeners of '2', 'Subset' and 'Top-level'.
- If 'Top-level' is being revoked, the producer calls InfoBus.fireRevokedEvent( ) for the item, indicating 'Top-level' as the one that changed, then it fires DataItemRevokedEvent on listeners of all sub-items, each indicating the sub-item as the one that changed. This continues until all sub-items of 'Top-level' at all levels are notified.
- Suppose 'All' is a RowsetAccess. When its cursor changes, fire RowsetCursorChangedEvent on listeners of 'All'. Then, for each column item that would return a different value as a result of the new cursor position, fire DataItemValueChanged on listeners of the columns whose value changed relative to the previous row.

Data Controllers

A data controller is an object that implements the InfoBusDataController interface and participates in the distribution of InfoBusEvents to consumers and producers on an InfoBus. Generally, the data controller is a pluggable module that gets added to an InfoBus in order to optimize some aspect of the communication on the bus.

The InfoBus supports multiple data controllers on one bus. When consumers on an InfoBus make requests for data or when producers make requests that Available or Revoked notices be sent, the InfoBus passes the request on to its registered data controllers by polling each in turn. Any controller polled can indicate to the InfoBus that the request should not be processed further by returning true from the method used to pass in the request. In this case the InfoBus will not poll remaining controllers, and returns the results, if any, to the requester of the action. If no data controller indicates an event is processed, or if no controllers are installed, the event is handled by the InfoBus default controller. The order in which the data controllers receive a request can be partially determined by a controller priority that is specified when the controllers are added to the bus. The default controller always has the lowest priority so that it is always last.

A data controller is not directly involved with data item method calls, nor is it involved with data item change events. This interaction is directly between producers and consumers, and the InfoBus does not intervene. However, a data controller could intervene on data item methods by keeping a producer's item and supplying a proxy in its place to the consumer.

The InfoBusDataController interface is very powerful and allows a controller to provide a range of functions that are not included in the basic services already supplied by an InfoBus. The following are some of the possible optimizations that a custom controller might perform. A single controller can implement one or many of the functions here.

A simple priority router is a function utilized by the data controller to identify a subset of the total producer and consumer population, perhaps by inspecting the package to which each belongs, or by detecting the presence of an identifying interface. Messages which originate in this subset are routed first within the subset. For example, a findDataItem( ) sent by a consumer in the subset will first query producers in the subset.

A late-binding controller is a function provided by a data controller that maintains tables of data item names along with the producers who announced them and/or the consumers that requested them. When a new findDataItem( ) is issued, the controller first (or perhaps only) queries producers in the table already associated with that name; likewise for a fireRevoked( ). Alternatives may send the request to all producers if the name is not tabled.

Wildcard support could be provided by a late-binding controller, in which case wildcards are used in matching requests to previously announced items.

A voting controller is utilized within the data controller to receive a findDataItem( ) request, query multiple producers even after a response is received, then select the best answer for its return result. An alternative is to use a custom interface on producers that could attach a priority or certainty to the results, allowing a method of identifying the best response.

A VM bridge function could be provided by a data controller to propagate InfoBus events, data items, and change events to a partner controller in a different VM, using RMI or other network transport. Such a bridge could be used to provide access to remote processes through the InfoBus.

An InfoBus traffic monitor data controller can be implemented as a debugging and the controller is set to MONITOR_PRIORITY so that it sees events ahead of other controllers. It monitors InfoBus activity and displays information or writes it to a log for debugging purposes.

Each InfoBus instance always contains a DefaultController that provides standard one-to-all distribution, where a consumer's request is sent to all producers and a producer's announcements are sent to all consumers. In the absence of any custom controllers, the presence of the DefaultController insures a basic, unoptimized level of operation. The DefaultController has the lowest possible priority and is therefore always the last controller on the request distribution list. If none of the data controllers ahead of the DefaultController indicates that the request has been handled, the DefaultController will get the request and process it.

The following methods, defined in the InfoBus class, allow a data controller to be added to or removed from an InfoBus.

The public synchronized void addDataController (InfoBusDataController controller, int priority) throws InfoBusMembershipException method registers the indicated controller with the InfoBus, causing it to be added to the list of registered controllers by the indicated priority.

The priority parameter denotes roughly where in the list of controllers the new controller should be placed. Once added, a data controller will remain at that priority level until removed. Any unique data controller object may only appear once in the list of controllers on a single InfoBus.

Calling the addDataController( ) method with a controller that is already present on the bus will cause an InfoBusMembershipException to be thrown. Calling this method on a stale InfoBus instance will cause StaleInfoBusException to be thrown.

The public synchronized void removeDataController (InfoBusDataController controller) method removes the specified controller from the InfoBus. Calling removeDataController( ) with a controller that is not currently listed on the InfoBus has no effect. An InfoBus instance will not remove itself from the virtual machine's set of active controllers if there are any data controllers (or InfoBusMembers, producers, or consumers) still registered on the bus. Therefore, applications that have registered a controller with one of their InfoBuses should remove the controller as they exit, just as they remove their member, producer, and consumer objects.

The creation and delivery of InfoBusEvents is handled exclusively by the InfoBus class. In order to permit an added data controller to optimize the distribution of events on a bus, the InfoBus provides a set of target-specific event delivery methods.

The target-specific event firing methods on the InfoBus are versions of the findDataItem( ) and fireItemAvailable/Revoked( ) methods that specify a single target or a list of specific targets to which the method should be applied. A data controller may call any combination of these methods when processing a request, but should avoid sending multiple events to the same target for efficiency's sake.

The data controller only calls the target-specific versions of the methods on the InfoBus. The methods that do not specify a target or targets are for the exclusive use of producers and consumers, and are handled by calling the data controllers. Calling them from a data controller will cause a loop where the request is again distributed to the data controllers for processing.

A data controller implements the InfoBusDataController interface to register with an InfoBus. There are no additional requirements on data controllers in terms of other InfoBus interfaces. That is, a data controller is free to implement InfoBusMember, InfoBusDataProducer, InfoBusDataConsumer, or any combination of these interfaces, but is not required to implement any of them.

For example, one type of controller might be an independent bean which gets and joins an InfoBus of its own accord, in which case implementing InfoBusMember is appropriate (it is a requirement of joining).

Another type of controller is one that is instantiated and controlled by other objects in a larger application—perhaps a primary producer or consumer in that application. In this case, the controller may only implement the InfoBusDataController interface; since another object is obtaining and setting the InfoBus in this controller, the controller need not even be an InfoBusMember. Again, it is critical in either case that the controller be properly removed from the bus when other participants are being removed and terminated, so that the InfoBus itself can be freed for garbage collection.

With multiple controllers being created in some situations, a priority for calling out data among the various controllers is needed. The priority specified when adding a controller is used to determine the insertion order in a linked list of established controllers. This list is traversed from the beginning to the end when processing events, so the priority also determines the order in which a controller will be given a chance to handle events. Because a controller can indicate that an event has been handled, and should not be passed on to other controllers for handling, a lower-priority controller may not see all of the events that a higher-priority controller handles.

The InfoBus class declares seven priority levels, with higher integers indicating higher priority, and higher priority controllers receiving requests before lower priority ones. The order of delivery among controllers having the same priority is unspecified. The InfoBus defines the following constants for priority values:

InfoBus.MONITOR_PRIORITY
InfoBus.VERY_HIGH_PRIORITY
InfoBus.HIGH_PRIORITY
InfoBus.MEDIUM_PRIORITY
InfoBus.LOW_PRIORITY
InfoBus.VERY_LOW_PRIORITY
InfoBus.DEFAULT_CONTROLLER_PRIORITY
 (reserved for javax.infobus.DefaultController)

The MONITOR_PRIORITY is reserved for data controller objects that need to be aware of all requests that arrive at the InfoBus, and is therefore the highest available priority. However, data controllers that assert MONITOR_PRIORITY are expected to be monitor processes, and not actively participate in event distribution. To enforce this concept, values returned by data controllers having MONITOR_PRIORITY are ignored, and the requests proceed to the data controllers with non-monitor status regardless of whether any such monitors exist.

If a priority is specified during addDataController( ) that is higher than VERY_HIGH_PRIORITY but not equal to MONITOR_PRIORITY, the object will be treated as having VERY_HIGH_PRIORITY because of the special restriction on MONITOR level controllers.

The DEFAULT CONTROLLER PRIORITY is the lowest possible priority, but is reserved for the javax.infobus.DefaultController that is always present in an InfoBus, to insure that DefaultController always handles a request that has not been completed by a previous controller. VERY_LOW_PRIORITY is therefore the lowest generally-available priority level. If a controller is added with a priority value lower than VERY_LOW_PRIORITY, it will have that value adjusted to VERY_LOW_PRIORITY.

Each data controller on the InfoBus maintains its own lists of producers and consumers that it wishes to serve, which may include all or a subset of the members on the bus. When the InfoBus passes a request to a data controller, the controller decides whether the request applies to the members on its private lists. If so, it calls one of the target-specific event firing methods on InfoBus to initiate delivery of the appropriate event to the members of its choosing. Conversely, if the request does not apply to the members handled by this data controller, the controller simply returns.

The InfoBus provides a copy of its master lists when a data controller first joins the bus, and then updates its data controllers on changes to the master lists. Because data controllers may only concern themselves with a subset of all participants, some additions to the InfoBus may not be reflected in the local list held by a data controller. However, when an InfoBus producer or consumer indicates that it is leaving the bus, all data controllers which included that participant locally are obliged to remove it from their distribution lists.

Data controllers that handle only a subset of producers and consumers may make such a determination when an add method is called.

The public void setConsumerList(Vector consumers) and public void setProducerList(Vector producers) are two data controller methods are called on by the InfoBus to which the controller has been added at the time that the controller joins the bus. This is done in order that the data controller can discover what producers and consumers were on the bus already when it joined.

public void addDataConsumer(InfoBusDataConsumer consumer)
public void addDataProducer(InfoBusDataProducer producer)
public void removeDataConsumer(InfoBusDataConsumer consumer)
public void removeDataProducer(InfoBusDataProducer producer)

These four methods are called by the InfoBus on each registered data controller when the InfoBus methods of the same names have been called to add a producer or consumer to the bus. This allows the controllers to make the appropriate adjustments to their lists.

Data controllers may receive add or remove notifications while in the process of handling a request; for example, delivery of an InfoBusItemRevokedEvent to one consumer may cause that consumer and possibly others to remove themselves from the bus. Data controllers must take care not to accidentally repeat delivery or, worse, skip delivery of events to some participants in such situations.

A set of methods has been defined already for event handling. Within the InfoBus class, these methods fire events for use by producer and consumer components. The events fired by consumers and producers are generally handled by the creation and distribution of appropriate events; for example, when a producer calls fireItemRevoked it expects an InfoBusItemRevokedEvent to be created and sent to the consumers on the bus.

When an InfoBus receives a request from a consumer or producer, it passes the request to its highest priority data controller. The data controller, in turn, decides whether the request applies to the members on its private lists. If so, it calls the target-specific event firing methods on InfoBus to initiate delivery of the appropriate event to the members of its choosing, possibly collecting returned results. Conversely, if the request does not apply to the members handled by this data controller, the controller simply returns.

The methods used to pass the requests to the data controller have a boolean return value which indicates whether the InfoBus should stop or continue processing the request. A return value of true indicates that all processing of this request is complete and that no further data controllers should be consulted; false indicates that the processing should continue with the next available controller.

The public boolean fireItemAvailable(String dataItemName, DataFlavor[] flavors, InfoBusDataProducer producer) method is called by an InfoBus to pass a producer's request for an ItemAvailable broadcast. A data controller can distribute an InfoBusItemAvailableEvent to any of its consumers by calling the target-specific versions of fireItemAvailable( ) on the InfoBus. The value of the source parameter from the calling of the data controller's method should be copied to all target-specific calls, to preserve the identity of the original requester.

The return value indicates whether processing is complete: if true, no other data controllers are called regarding this request.

The public boolean fireItemRevoked(String dataItemName, InfoBusDataProducer producer) method is called by an InfoBus to pass a producer's request for an ItemRevoked broadcast. A data controller can distribute an InfoBusItemRevokedEvent to any of its consumers by calling the target-specific versions of fireItemRevoked( ) on the InfoBus. The value of the source parameter from the calling of the data controller's method should be copied to all target-specific calls, to preserve the identity of the original requester. The return value indicates whether processing is complete: if true, no other data controllers are called regarding this request.

The public boolean findDataItem(String dataItemName, DataFlavor[] flavors, InfoBusDataConsumer consumer, Vector foundItem) method is called by an InfoBus to pass a consumer's request for the named data item. A data controller uses the InfoBus's target-specific versions of findDataItem( ) to query any of its producers. The value of the consumer parameter from the calling of the data controller's method should be copied to all target-specific calls, to preserve the identity of the original requester.

The foundItem Vector is passed by the InfoBus as a location for storing a response if one is found. If foundItem is not empty when the call completes, the element at 0 in the Vector is taken as the result and passed by the InfoBus back to the consumer. In this case, the boolean return value is ignored and no other controllers receive the request. If the foundItem Vector is empty after the method completes, the return value indicates whether processing is complete: if true, no other data controllers are called regarding this request, and null is passed to the requesting consumer.

The public boolean findMultipleDataItems(String dataItemName, DataFlavor[] flavors, InfoBusDataConsumer consumer, Vector foundItems) method is called by an InfoBus to pass a consumer's request for the named data item. A data controller uses the InfoBus's target-specific versions of findDataItem( ) to query any or all producers it is managing. The value of the consumer parameter from the calling of the data controller's method should be copied to all target-specific calls, to preserve the identity of the original requester.

The foundItem Vector is passed by the InfoBus as a location for storing responses if found. If foundItem is not empty when the call completes, the elements in the Vector are concatenated by the InfoBus with results from other controllers polled (with elimination of duplicate occurrences of an object). The return value indicates whether processing is complete: if true, no other data controllers are called regarding this request.

Although a consumer's findMultipleDataItems( ) request is sent to data controllers, it should only be handled in special cases. The desired behavior of a findMultipleDataItems( ) is that each producer on the bus be queried exactly once for the named data, and the collection of all responses is returned in foundItems. This behavior is exactly that performed by the DefaultController and, therefore, custom data controllers should usually simply defer to the DefaultController for handling the find-multiple case, by returning by returning false and leaving foundItems empty.

In situations where a custom controller decides to handle findMultipleDataItems( ), there are some special considerations.

The single-target version of findDataItem( ) should be used to query each producer being managed in turn—the Vector version will stop on the first response and is therefore unsuitable for gathering multiple response data.

Results returned by the data controllers are concatenated by the InfoBus. The InfoBus will remove redundant responses by eliminating duplicate objects from the concatenated array; however, producers that are queried more than once may return different response objects (based, for example, on the security clearances on inquiring classes, which will include the controllers themselves).

In short, the two safest ways to handle a findMultipleDataItems( ) within a data controller are to either do nothing (rely on the DefaultController) or, conversely, to query all producers on the bus and then return true to stop further processing. Firing an event to a component then returning false to allow handling by other controllers will always result in an event being fired more than once to the same component and should be avoided.

Figure 14:
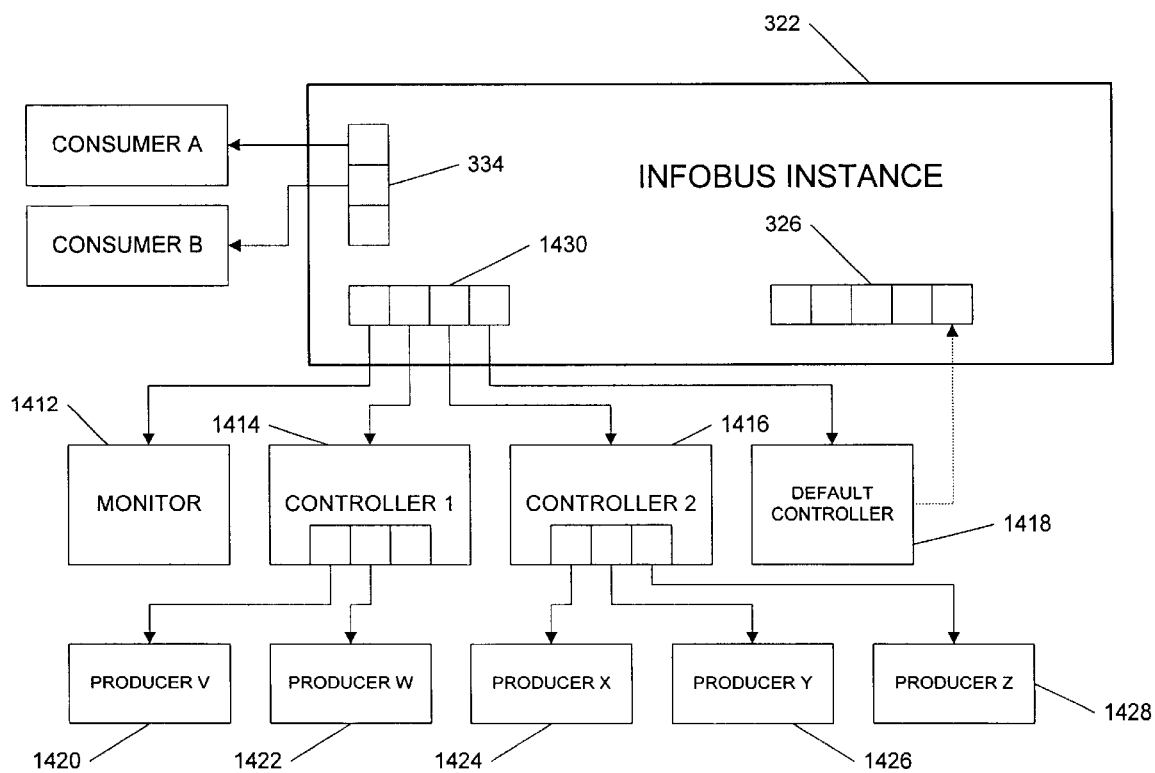
FIG. 14 illustrates conceptually an event distribution example utilizing multiple controllers.

FIG. 14 illustrates the handling of a consumer's request event in a system 1410 with four established controllers 1412–1418, two consumers 1430 and 1432, and five producers 1420–1428. In the diagram, the controllers were added as follows:

The event monitor controller 1412 was added as MONITOR_PRIORITY. As the highest priority controller, it sees all events. Because it is passive and does not send events, it does not maintain lists of producers or consumers. The controllers 1412–1418 are listed in controller list 1430.

Controllers 1414 and 1416 were added at HIGH_PRIORITY and MEDIUM_PRIORITY respectively. For this example these controllers only manage requests to producers 1420–1428 and so do not have lists of consumers, although they could, if they wanted, manage announcements to consumers as well. Controller 1414 decided that it would manage producers 1420 and 1422. Controller 1416 decided that it would manage producers 1424, 1426, and 1428.

The default controller 1418 was created with DEFAULT_CONTROLLER_PRIORITY so that it is always the last controller to handle events. It is created by the InfoBus instance 322, and has package-level access to the InfoBus's producer list 326, so it does not keep its own copy. It implements the default rules (all producers see all requests, all consumers see all available/revoke announcements) when none of the other controllers indicates that an event has been handled. Because no other controllers handles available and revoke announcements, the default controller handles these events.

Also, the Vector 326 used for the producer list has entries for each of the producers 1420–1428, but the lines are not drawn in order to keep the diagram readable.

Suppose Consumer A requests an item called "Sales." It does this by calling the InfoBus method findDataItem( ). The InfoBus handles the request by calling each controller in order of priority.

The InfoBus calls findDataItem( ) on each controller in turn until one says the event has been handled. The monitor controller logs the event. Controller 1 asks producers V and W by calling findDataItem( ) with its Vector as the list of targets. In this example neither V nor W can supply a "Sales" item, so Controller 1 puts nothing in the foundItem Vector and returns false. The InfoBus next calls Controller 2, which calls producer X. X is able to supply the item, so Controller 2 stores the item reference in the foundItem Vector, does not need to call its other producers, and returns true. The default controller is not called in this case.

As another example, suppose producer V announces the availability of "Sales Forecast." Each controller is invited in turn to handle the event. Because controllers 1 and 2 only handle data item requests, the default controller handles the announcement by distributing it to both consumers.

Infobus Policyhelper

The InfoBusPolicyHelper interface provides a means of centralizing security-related decisions. The decisions made in this class implement the permission and security mechanism used for all consumers, producers, and data controllers.

The InfoBus class holds a single object of type InfoBusPolicyHelper as a static variable. Whenever an InfoBus object is about to perform an activity (such as registering an InfoBusConsumer or distributing an InfoBusItemAvailableEvent), it first calls a method on that static variable to ensure the policy helper permits it. If the policy helper does not approve of the action, it throws a runtime exception which goes uncaught in the InfoBus.

This design strategy is optimized for use of the Java 1.2 Security Architecture—e.g., AccessController.checkPermission( ) is called within the policy helper and an AccessControlException thrown if the action is not permitted. However, the specification of InfoBusPolicyHelper is general enough to allow implementations which do not rely on Java 1.2 mechanisms.

The other activity delegated to the InfoBusPolicyHelper is the creation of default InfoBus names—when an InfoBusMember calls InfoBus.get(Object), the InfoBus in turn calls the policy helper's generateDefaultName( ) method.

Security and default naming functions are encapsulated in InfoBusPolicyHelper to provide flexibility in making these decisions. The javax.infobus package includes a default implementation of the interface in the javax.infobus.DefaultPolicy class, but specification of a different policy helper class can be made by setting a system property called javax.infobus.InfoBusPolicy.

The InfoBusPolicyHelper interface encapsulates several security decisions and default InfoBus name generation in one interface. The InfoBus class holds a single object of this type as a static variable, and all InfoBus instances perform a call to one of its security methods before performing an action. The implementation of InfoBusPolicyHelper considers the action being requested on behalf of a caller and may throw a runtime exception if it disapproves. This consideration may include examining the call stack and deciding on the basis of the classes it finds whether to grant permission.

It is not necessary for the policy helper to pass judgement on every method provided in the interface: a very relaxed policy helper may implement all security checks as no-ops (empty methods), while a very strict policy helper may introduce an arbitrarily complex set of checks and permissions before approving any action.

The static variable holding the InfoBusPolicyHelper in use is initialized when an InfoBus static method is called or when an InfoBus constructor is called, whichever occurs first. Once instantiated the policy helper static variable is immutable: no means of changing the policy helper is available short of restarting the JVM.

The public String generateDefaultName(Object object) method is used to generate a default name when one is not provided. The implementer of InfoBusPolicyHelper is responsible for determining the default InfoBus naming strategy in use. The InfoBus limits the parameter of the get( ) method to an object of type java.awt.Component or java.beans.BeansContext. From the object parameter, the policy helper must create a String that denotes the default InfoBus name for the object.

A default name policy must generate names that allow objects in a shared space—for example, on a single web page or within a single BeanContext—to communicate without having prior knowledge of what InfoBus name to specify. Ideally, the default name policy should generate names in which objects in other spaces (i.e. a different web page) get a different bus, so that InfoBuses do not get overpopulated.

public void canGet(String busName)
public void canJoin(InfoBus infobus, InfoBusMember member)
public void canRegister(InfoBus infobus, InfoBusMember member)
public void canPropertyChange(InfoBus infobus, java.beans.PropertyChangeEvent event)
public void canAddDataProducer(InfoBus infobus, InfoBusDataProducer producer)
public void canAddDataConsumer(InfoBus infobus, InfoBusDataConsumer consumer)
public void canAddDataController(InfoBus infobus, InfoBusDataController controller, int priority)
public void canFireItemAvailable(InfoBus infobus, String dataItemName, InfoBusDataProducer producer)
public void canFireItemRevoked(InfoBus infobus, String dataItemName, InfoBusDataProducer producer)
public void canRequestItem (InfoBus infobus, String dataItemName, InfoBusData Consumer consumer)

The security methods on InfoBusPolicyHelper are named to reflect the methods from which an InfoBus object will call them, and usually include as parameters a reference to the calling InfoBus and all parameters that the InfoBus method has been provided. In general, the policy helper method canXYZ is called by an InfoBus before performing the activity in method XYZ. For example, the implementation of the InfoBus method addDataProducer (InfoBusDataProducer producer) calls the InfoBusPolicyHelper method canAddDataProducer(InfoBus, InfoBusDataProducer) with parameters set to (this, producer)—before permitting the producer's registration. The exception to this naming pattern is InfoBusPolicyHelper.canRequestItem( ), which is called by the InfoBus methods findDataItem( ) and findMultipleDataItems( ).

The parameters provided to the InfoBusPolicyHelper method generally include all those provided to the parent InfoBus method to allow maximum flexibility in determining whether an action is permissible.

These security methods are called from InfoBus before performing an action. InfoBus methods that check to see if the InfoBus object is stale will perform that check and throw an Exception if it is stale before calling the policy helper security method (because the exception prevents the action, and a replacement bus may permit the action where the stale one may not have).

The InfoBusPolicyHelper implementation in use may consider the requested action and throw a RuntimeException if it disapproves; if the action is permitted, the security method simply returns. The policy helper implementation can introduce a set of Permissions corresponding to InfoBus activity that it may want to restrict. When the security method is called, the policy helper can formulate the appropriate permission and call AccessController.checkPermission( ) to see if the Permission is granted in the current java.policy. If it is not, the AccessController throws an AccessControlException. Both the policy helper and the InfoBus then propagate the AccessControlException, which should generally propagate to the system level to indicate the unpermitted activity.

The DefaultPolicy class implements the InfoBusPolicyHelper interface and is the policy helper put into effect if the javax.infobus.InfoBusPolicy system property is nonexistent or unreadable.

There are several exception classes provided with the InfoBus and their function is described below.

The first exception is InfoBusMembershipException. This Exception is thrown by the InfoBus core code when it will not allow an action related to membership with the bus. For example, this exception is thrown when InfoBusMemberSupport is called on a class that is already a member of a bus.

DuplicateColumnException class is thrown in RowsetAccess methods when a duplicate column is found.

ColumnNotFoundException class is thrown in RowsetAccess methods when a specified column cannot be found.

InvalidDataException is a class that extends java.lang.Exception, and is thrown by any InfoBus method which modifies data. The producer may throw the exception when data cannot be accepted as specified, such as an invalid date.

RowsetValidationException is a class that extends InvalidDataException to provide more information about the Rowset on which the exception occurred. A RowsetValidationException may be thrown by any RowsetAccess (or sub-interface) method that modifies data.
public RowsetValidationException (String message, RowsetAccess rowset, InfoBusPropertyMap map)
The constructor for RowsetValidationException specifies a message string, a reference to the rowset on which validation failed, and an optional reference to an implementation of InfoBusPropertyMap for supporting properties on this exception. When properties are not supported, null should be specified for map.

The public RowsetAccess getRowset( ) method returns a reference to the RowsetAccess object on which the validation problem was detected.

The public Object getProperty(String propertyName) method returns a property or metadata information about the validation exception. Support for properties is optional; null should be returned for unsupported properties.

Support for properties is optional. If no property map was specified on the constructor, getProperty( ) returns null. Otherwise, this method calls InfoBusPropertyMap.get( ) with the specified key and returns the result. null is the conventional return value when the specified key is not supported as a property name.

UnsupportedoperationException is a runtime exception that may be thrown for optional methods that are not supported, such as methods that modify data when the producer provides read-only access.

StaleInfoBusException is thrown when certain operations are attempted on an InfoBus instance that has become "stale."

Object-oriented technology forms the basis for the info bus architecture 200 of the present invention. For the purpose of the illustrative embodiment, components are essentially Java objects that conform to the Java Beans and Java specifications.

A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A method of distributing data events between a plurality of applications operating on a computer system, comprising:
    A) establishing multiple instances of a virtual information bus (InfoBus) on the computer system, each of the virtual information bus instances having at least one data controller associated therewith to enable interaction between data producer and data consumer members of the virtual information bus instance;
    B) registering selected of the plurality of the applications as any of data producer and data consumer members of at least one of the InfoBus instances;
    C) assigning each application registered with an InfoBus instance to a selected data controller;
    D) sending data events over the InfoBus to a selected data controller; and a
    E) forwarding the data events to each application assigned to the selected data controller.

2. The method according to claim 1 wherein the data event is a request for a data element found within one of the applications.

3. The method according to claim 1 wherein the data event is an announcement of an available data element within one of the applications.

4. (Previously amended) The method according to claim 1 wherein the data event is an announcement of a changed data element within one of the applications.

5. The method according to claim 1 further comprising the step of:
    E) establishing an order of priority to notify each data controller of the data events.

6. The method according to claim 5 further comprising the step of:
    F) establishing an order of priority to notify each application assigned to each data controller of the data events.

7. The method according to claim 1 further comprising the step of:
    G) establishing a virtual machine (VM) bridge between a first data controller in a first VM and a second data controller in a second VM.

8. The method according to claim 1 further comprising the step of:
    H) adding each registered application to a list of members of the InfoBus.

9. The method according to claim 1 further comprising the step of:
    J) adding each data controller to a list of data control members of the InfoBus.

10. In an object-oriented computer system having multiple participants, a communications bus for sharing data between the multiple participants comprising:
    membership generator logic configured to grant each requesting participant membership to one of a plurality of virtual communications bus instances as any of data producer and data consumer members;
    data event builder logic configured to prepare data events occurring on the computer system;
    data notification logic, responsive to the data event builder logic, configured to notify all participant members of the data events generated by the data event builder logic; and
    data control logic, coupled to the data notification logic, configured to prioritize the notification of data events to the multiple participants of one of the plurality of virtual communication bus instances.

11. The communications bus of claim 10 wherein a data event serves to announce the availability of a new data element.

12. The communications bus according to claim 10 wherein a data event serves to request a given data element located in one of the member participants.

13. The communications bus according to claim 10 wherein a data event serves to announce a changed data element in one of the member participants.

14. The communications bus according to claim 10 wherein the data control logic is configured to prioritize the notification of data events to selected groups of the multiple participants.

15. The communications bus according to claim 10 wherein the data control logic is configured to provide selected grouping of the multiple of participants.

16. The communications bus according to claim 14 wherein the data control logic is configured to establish a virtual machine (VM) bridge between a first data controller in a first VM and a second data controller in a second VM.

17. The communications bus according to claim 10 wherein the membership generator logic generates a list of registered applications.

18. A computer program product for use within a computer system to provide data event notification among participating applications, the computer program product comprising a computer usable medium having computer readable program code embodied on the medium , the program code comprising:

program code to establish multiple virtual communications buses over the computer system, each of the virtual communication busses having at least one data controller associated therewith to enable interaction between data producer and data consumer members of the virtual communication bus;

program code to register selected of the applications as any of data producer and data consumer participating applications with at least one of the virtual communications buses;

program code to assign each registered application associated with one of the virtual communications buses to a selected data controller;

program code to communicate data events to the data controller;

program code to forward the data events to each application assigned to the data controller in its its.

19. The computer program product according to claim 18 wherein each data element is associated with at least one of the member applications.

20. The computer program product according to claim 18 wherein the data event is a request for a data element found within one of the member applications.

21. The computer program product according to claim 18 wherein the data event is an announcement of an available data element within one of the member applications.

22. The computer program product of claim 18 wherein the data event is an announcement of a changed data element within one of the member applications.

23. The computer program product according to claim 18 further comprising program code to establish an order of priority to notify each data controller of data events.

24. The computer program product according to claim 18 further comprising program code to establish an order of priority to notify each application assigned to each data controller of the data events.

25. The computer program product according to claim 18 further comprising program code to add each registered application to a list of members.

26. The computer program product according to claim 18 further comprising program code to establish a virtual machine (VM) bridge between a first data controller in a first VM and a second data controller in a second VM.

* * * * *

UNITED STATES PATENT AND TRADEMARK OFFICE
CERTIFICATE OF CORRECTION

PATENT NO. : 6,704,803 B2  Page 1 of 1
DATED : March 9, 2004
INVENTOR(S) : Douglass J. Wilson and Mark T. Colan It is certified that error appears in the above-identified patent and that said Letters Patent is hereby corrected as shown below:

Column 60,
Line 9, please delete "in its its".

Signed and Sealed this

First Day of June, 2004

JON W. DUDAS
*Acting Director of the United States Patent and Trademark Office*